United States Patent
Izumi et al.

(10) Patent No.: US 12,311,460 B2
(45) Date of Patent: May 27, 2025

(54) REPLACING AND HOLDING DEVICE FOR ELECTRODE TIP

(71) Applicants: Obara Corporation, Yamanashi (JP); TOYOTA JIDOSHA KABUSHIKI KAISHA, Aichi-ken (JP)

(72) Inventors: Takehiro Izumi, Fuefuki (JP); Yoshinori Ando, Fuefuki (JP); Tsubasa Mochizuki, Fuefuki (JP); Masahiro Kimura, Fuefuki (JP); Masayuki Fujiwara, Toyota (JP)

(73) Assignees: OBARA CORPORATION, Yamanashi (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 342 days.

(21) Appl. No.: 17/949,723

(22) Filed: Sep. 21, 2022

(65) Prior Publication Data

US 2023/0102505 A1     Mar. 30, 2023

(30) Foreign Application Priority Data

Sep. 28, 2021   (JP) .................................. 2021-158454

(51) Int. Cl.
*B23Q 3/00* (2006.01)
*B23K 11/30* (2006.01)

(52) U.S. Cl.
CPC ................................ *B23K 11/3072* (2013.01)

(58) Field of Classification Search
CPC .... B25B 1/00; B25B 3/00; B25B 5/00; B25B 11/00; B23Q 3/00
See application file for complete search history.

(56) References Cited

U.S. PATENT DOCUMENTS 5,592,726 A * 1/1997 Suresh .................... B25B 27/10
                                                            29/520
5,906,034 A * 5/1999 Weisshaar ............. B25B 27/062
                                                            269/93

(Continued)

FOREIGN PATENT DOCUMENTS

| JP | 2005-066682 | 3/2005 |
| JP | 2008-126284 | 6/2008 |
| JP | 5123066 | 1/2013 |

OTHER PUBLICATIONS

Office Action issued Feb. 13, 2024 in corresponding Korean Application No. 10-2022-0118772, with English-language translation.

*Primary Examiner* — Lee D Wilson
(74) *Attorney, Agent, or Firm* — Wenderoth, Lind & Ponack, L.L.P.

(57) ABSTRACT

A replacing and holding device includes an electrode tip puller including two stacked pick plates inserted between an end face of an electrode tip fitted into a shank fixed to a gun arm of a welding gun and an end face of a larger diameter portion of the shank, a guide rod that guides motions of the pick plates in a stacked direction thereof, a pick plate interspace increasing mechanism that increases a space between the pick plates according to positions of the pick plates along the guide rod, an electrode tip holder in one of the pick plates to hold the electrode tip pulled out from the shank, and an electrode tip contact portion in front of the shank in an insert direction of the shank, wherein the electrode tip comes into contact by a motion of the welding gun to insert the shank into the electrode tip.

14 Claims, 18 Drawing Sheets

(56) References Cited

U.S. PATENT DOCUMENTS

| | | | | |
|---|---|---|---|---|
| 7,134,651 B1* | 11/2006 | Beck | ...................... | B25B 5/102 |
| | | | | 269/147 |
| 8,413,971 B2* | 4/2013 | Kim | ........................ | B08B 7/02 |
| | | | | 269/228 |
| 8,434,205 B2* | 5/2013 | Dewell | .................. | B25B 27/10 |
| | | | | 29/257 |
| 8,813,326 B2* | 8/2014 | Zychowski | ............ | B25B 27/30 |
| | | | | 269/6 |
| 9,278,441 B2* | 3/2016 | Sindelar | ................ | B25B 27/10 |
| 2009/0020937 A1* | 1/2009 | Odell | .................... | B25B 1/2468 |
| | | | | 269/271 |
| 2009/0146354 A1* | 6/2009 | Metroyanis | ......... | E04G 21/1891 |
| | | | | 269/74 |
| 2013/0086782 A1* | 4/2013 | Dewell | .................. | B25B 27/10 |
| | | | | 29/237 |
| 2014/0033491 A1* | 2/2014 | Donaldson | .......... | B29C 66/5344 |
| | | | | 29/237 |

* cited by examiner

REPLACING AND HOLDING DEVICE FOR ELECTRODE TIP

CROSS-REFERENCE TO RELATED APPLICATION

The present application is based on and claims priority from Japanese patent application No. 2021-158454 filed on Sep. 28, 2021, the disclosure of which is hereby incorporated by reference in its entirety.

FIELD OF THE INVENTION

The present disclosure relates to a replacing and holding device for an electrode tip.

BACKGROUND in a welding gun used for resistance welding, a taper is used to fit an exchangeable electrode tip into a tip of a shank fixed to a gun arm of the welding gun. An electrode tip wears with use. Accordingly, the electrode tip is replaced when the electrode tip wears to a certain level.

In replacing the electrode tip, a device for removing the electrode tip from the shank is used (see JP 5123066 B, for example). The device for removing the electrode tip utilizes the motions of the welding gun to remove the electrode tip from the shank, and the device itself does not need to be powered.

The device for removing the electrode tip disclosed in JP 5123066 B increases the space between two pick plates (boards for removing the tip) inserted between a larger diameter portion of the shank and an end face of the electrode tip, whereby the electrode tip is pulled out from the shank in an axial direction. In this device, the removed electrode tip falls by gravity since the electrode tip is designed to be discarded when worn off and is not designed to be reused.

However, electrode tips with different shapes are used depending on welding portions. In this case, welding guns corresponding to the shapes of the electrode tips are provided. Accordingly, it is necessary to prepare the same number of welding guns as the number of shapes of the electrode tips to be used.

The present invention has been made in light of the circumstances, and an object of the present invention is to provide a replacing and holding device for an electrode tip capable of removing the electrode tip using a welding gun, holding the removed electrode tip, and attaching the held electrode tip.

SUMMARY

The present invention relates to a replacing and holding device for an electrode tip, the replacing and holding device including:
 an electrode tip puller comprising two pick plates stacked one another, the two pick plates being inserted between an end face of the electrode tip fitted into a shank fixed to a gun arm of a welding gun and an end face of a larger diameter portion of the shank;
 a guide rod configured to guide motions of the two pick plates in a stacked direction thereof;
 a pick plate interspace increasing mechanism configured to increase a space between the two pick plates according to positions of the two pick plates guided along the guide rod;
 an electrode tip holder disposed in one of the two pick plates to hold the electrode tip pulled out from the shank; and
 an electrode tip contact portion provided in front of the shank in an insertion direction of the shank, wherein the electrode tip comes into contact by a motion of the welding gun to insert the shank into the electrode tip held by the electrode tip holder.

DETAILED DESCRIPTION

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

Hereinafter, an embodiment of a replacing and holding device for an electrode tip according to the present disclosure will be described with reference to the drawings.

Figure 1:
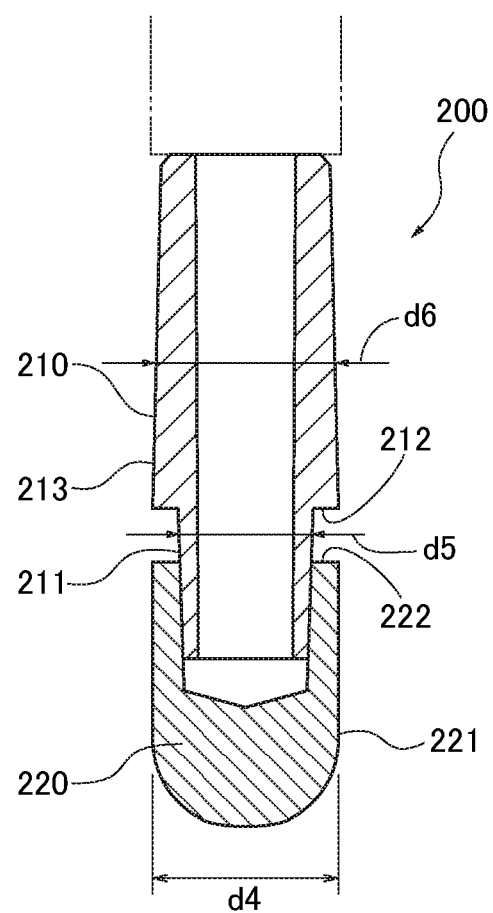
FIG. 1 is a cross-sectional view illustrating a state where an electrode tip is attached to a leading end of a shank fixed to a gun arm of a welding gun.

FIG. 1 is a cross-sectional view illustrating a state where an electrode tip 220 is attached to a leading end of a shank 210 fixed to a gun arm of a welding gun 200. As illustrated in FIG. 1, the shank 210 is fixed to the gun arm of the welding gun 200. The shank 210 includes a thicker and larger diameter portion 213 and a smaller diameter portion 211. The thick larger diameter portion 213 is located on a root side of the shank 210 which is fixed to the gun arm of the welding gun 200. The smaller diameter portion 211 is thinner than the larger diameter portion 213 and located on a leading end of the shank 210.

The larger diameter portion 213 has an outer diameter d6. The smaller diameter portion 211 has an outer diameter d5 which is smaller than an outer diameter d6 (i.e., d5<d6). A step is formed at a boundary between the larger diameter portion 213 and the smaller diameter portion 211. The step includes an end face 212 of the larger diameter portion 213. The smaller diameter portion 211 has a tapered shape where a diameter becomes smaller toward the leading end. The outer diameter d5 of the smaller diameter portion 211 is the largest outer diameter of the smaller diameter portion 211 and is closest to the end face 212.

The smaller diameter portion 211 of the shank 210 is inserted into the electrode tip 220 in an axial direction. The electrode tip 220 is fitted onto the shank 210 by friction between a tapered outer peripheral surface of the smaller diameter portion 211 and an inner peripheral surface of the electrode tip 220. The electrode tip 220 includes an outer peripheral portion 221. The outer peripheral portion 221 has an outer diameter d4 which is larger than the outer diameter d5 of the smaller diameter portion 211. The electrode tip 220 fitted into and attached to the shank 210 is pulled out and removed from the shank 210 by separating an end face 222 of the electrode tip 220 and the end face 212 of the larger diameter portion 213 in the axial direction.

FIGS. 2 to 6 are side views for briefly describing actions of a replacing and holding device 100 for the electrode tip according to an embodiment of the present disclosure.

Figure 2:
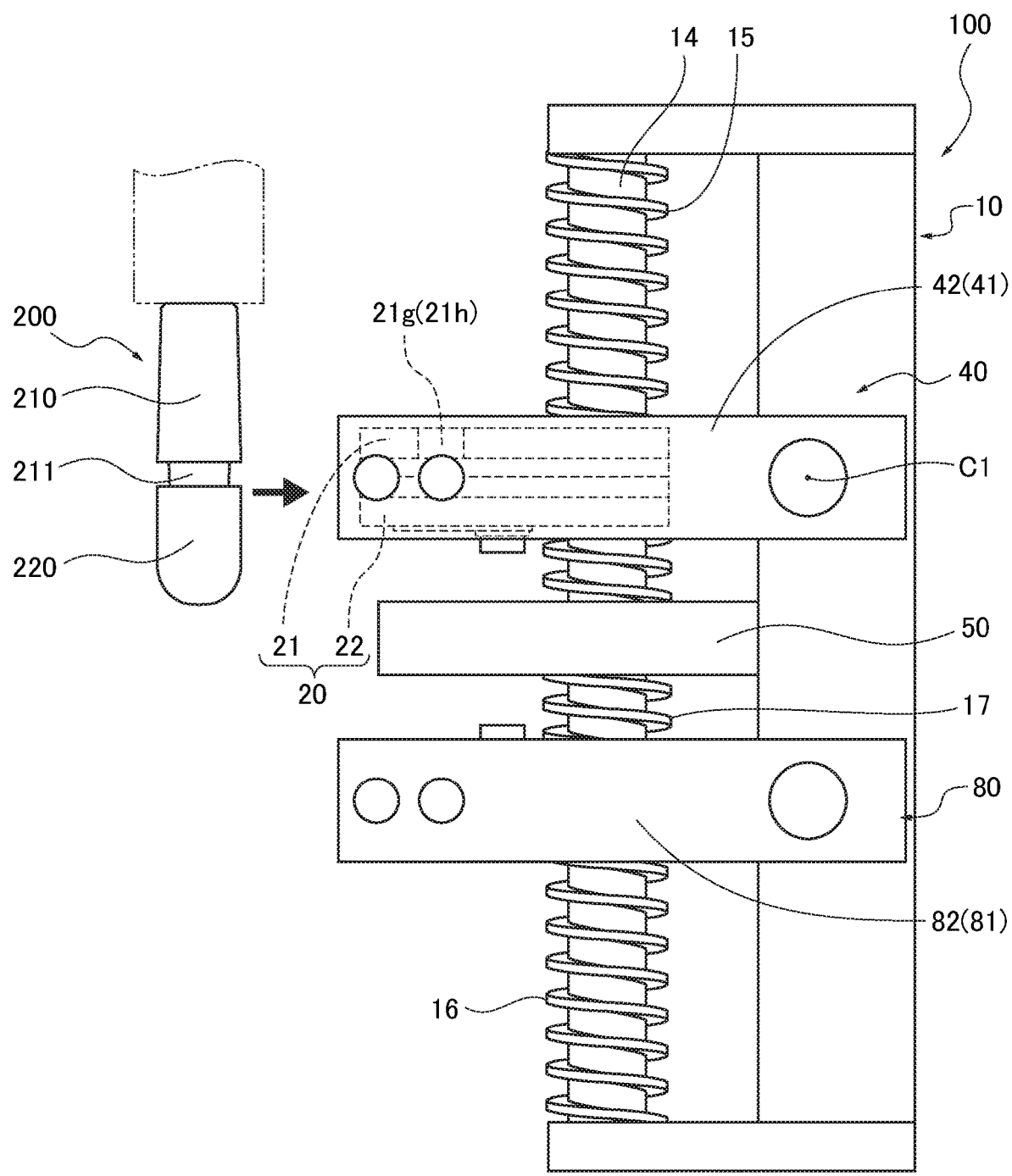
FIG. 2 is a side view briefly describing actions of a replacing and holding device for the electrode tip according to an embodiment of the present disclosure and illustrating a state before removing the electrode tip from the shank fixed to the gun arm of the welding gun.
Figure 3:
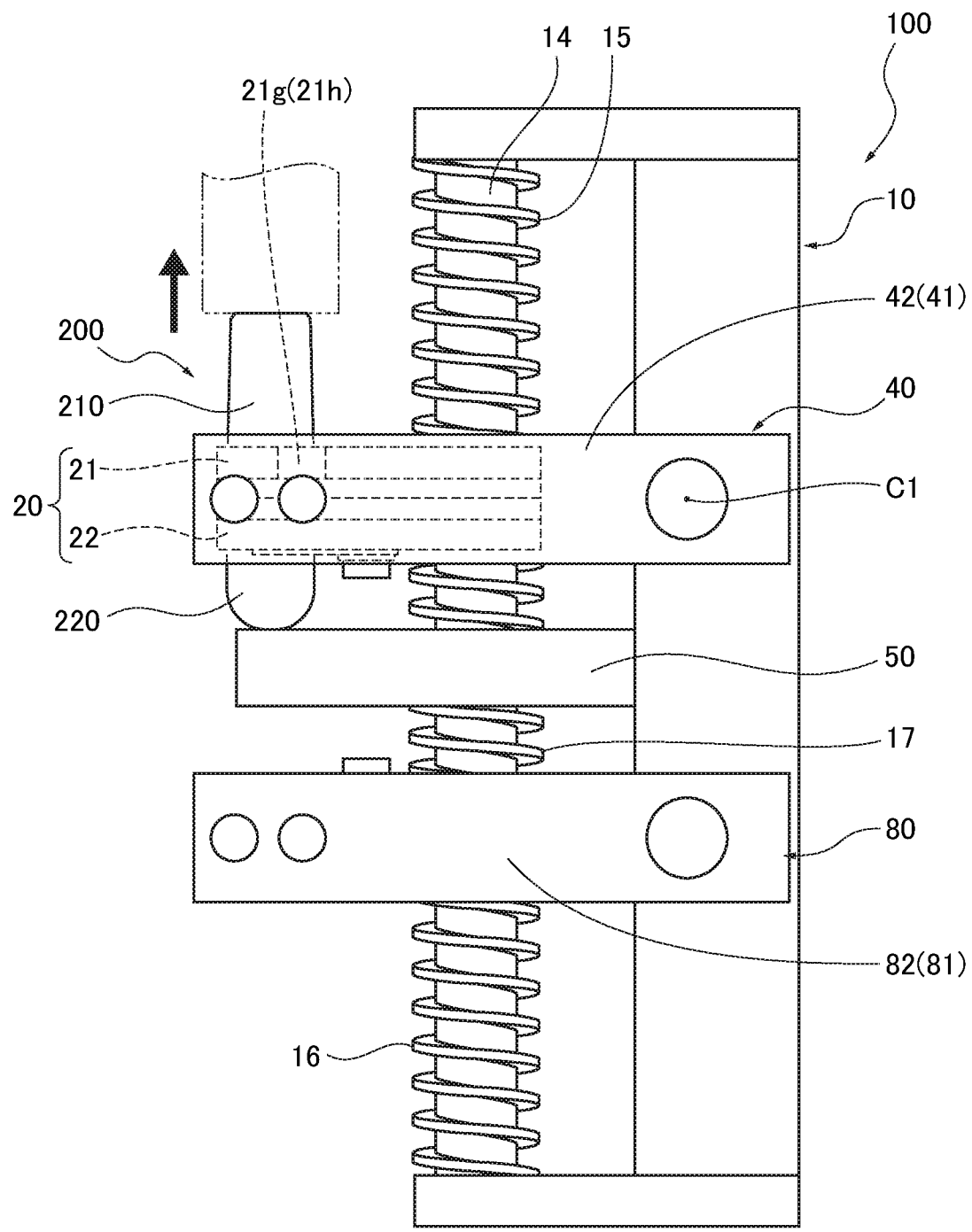
FIG. 3 is a side view illustrating a state where the gun arm of the welding gun is set to the replacing and holding device.
Figure 4:
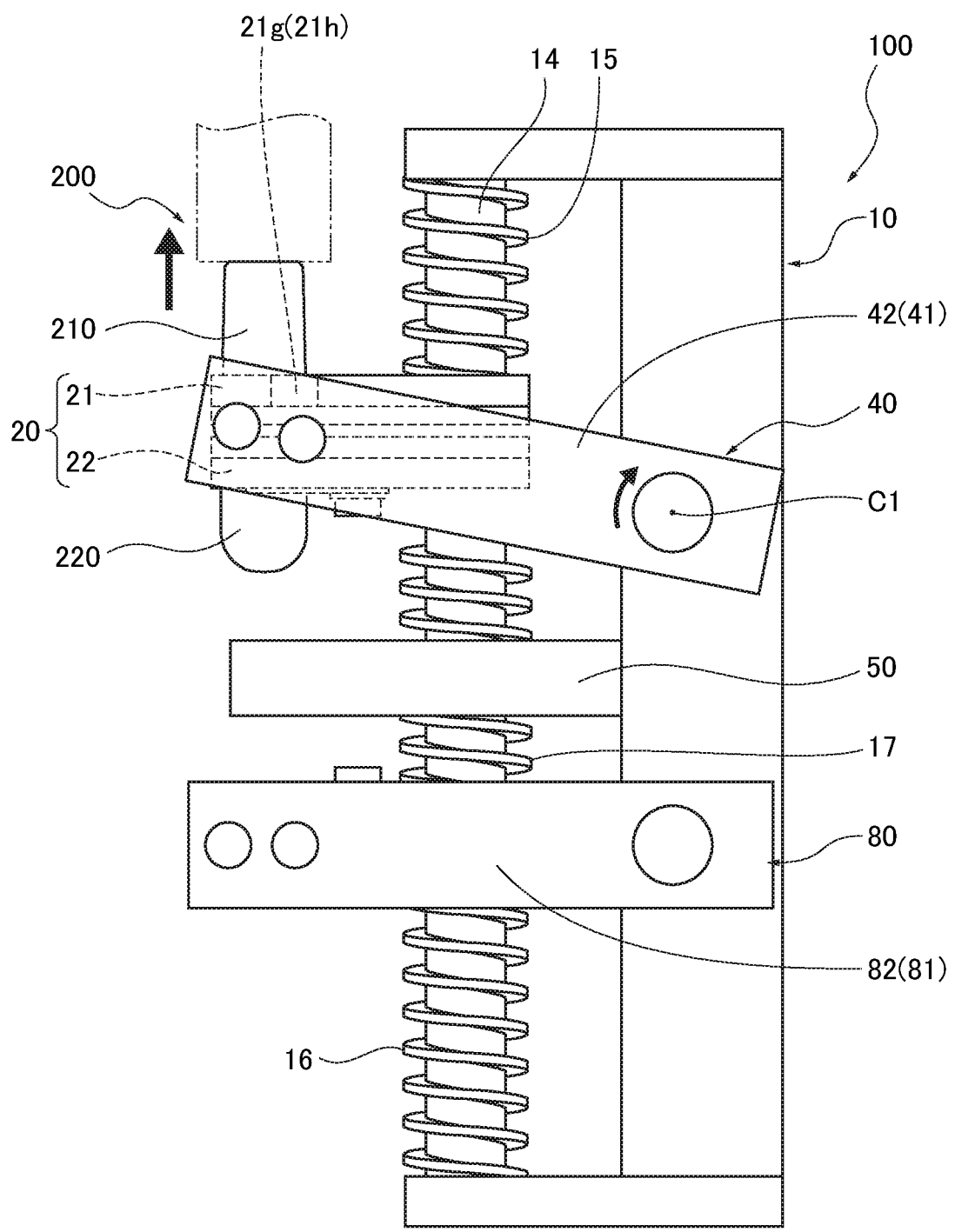
FIG. 4 is a side view illustrating an upward motion (in a direction indicated by an arrow in FIG. 3) of the welding gun to pull out and remove the electrode tip.
Figure 5:
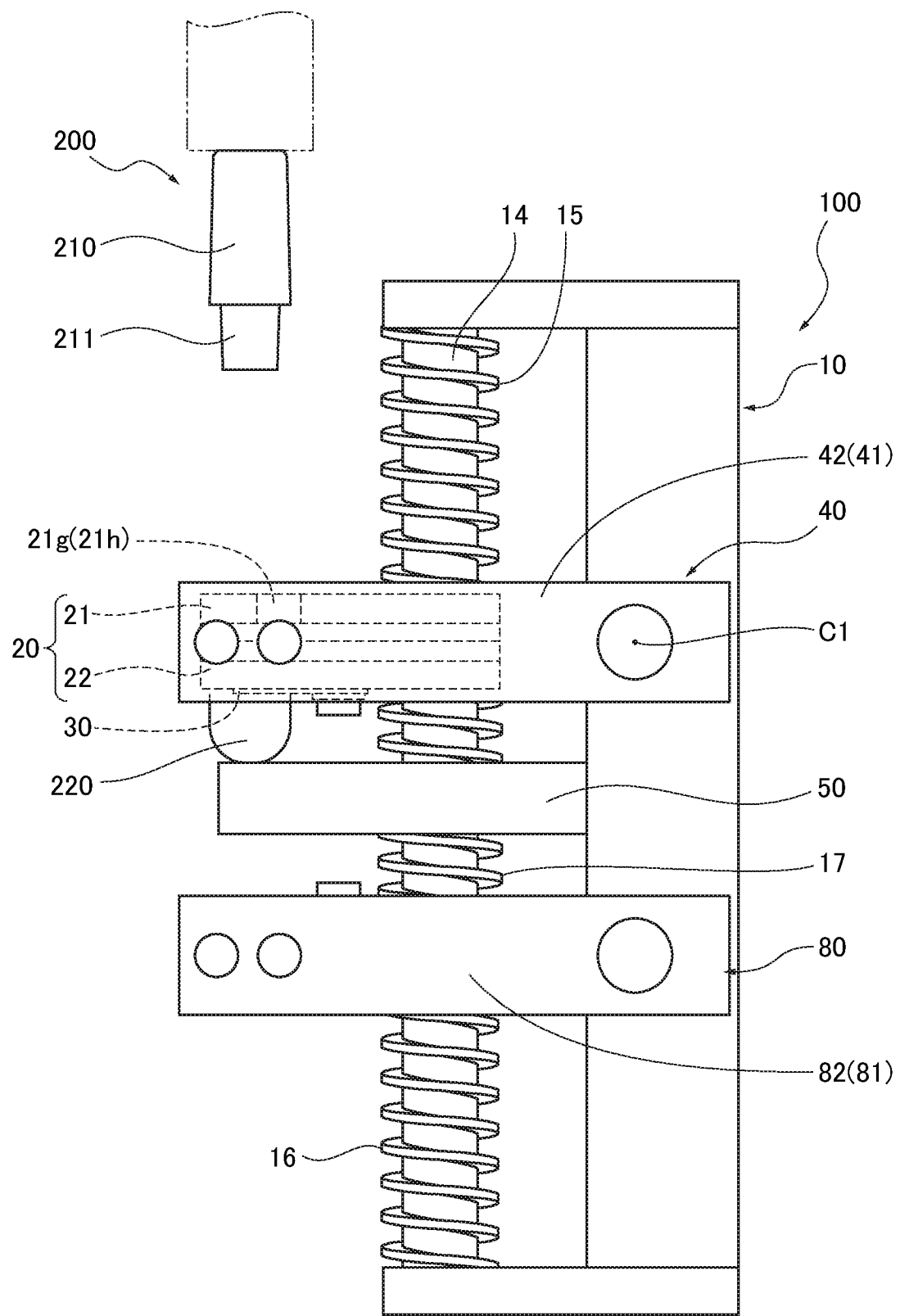
FIG. 5 is a side view illustrating a state where the electrode tip removed from the shank fixed to the gun arm of the welding gun is held by the replacing and holding device.
Figure 6:
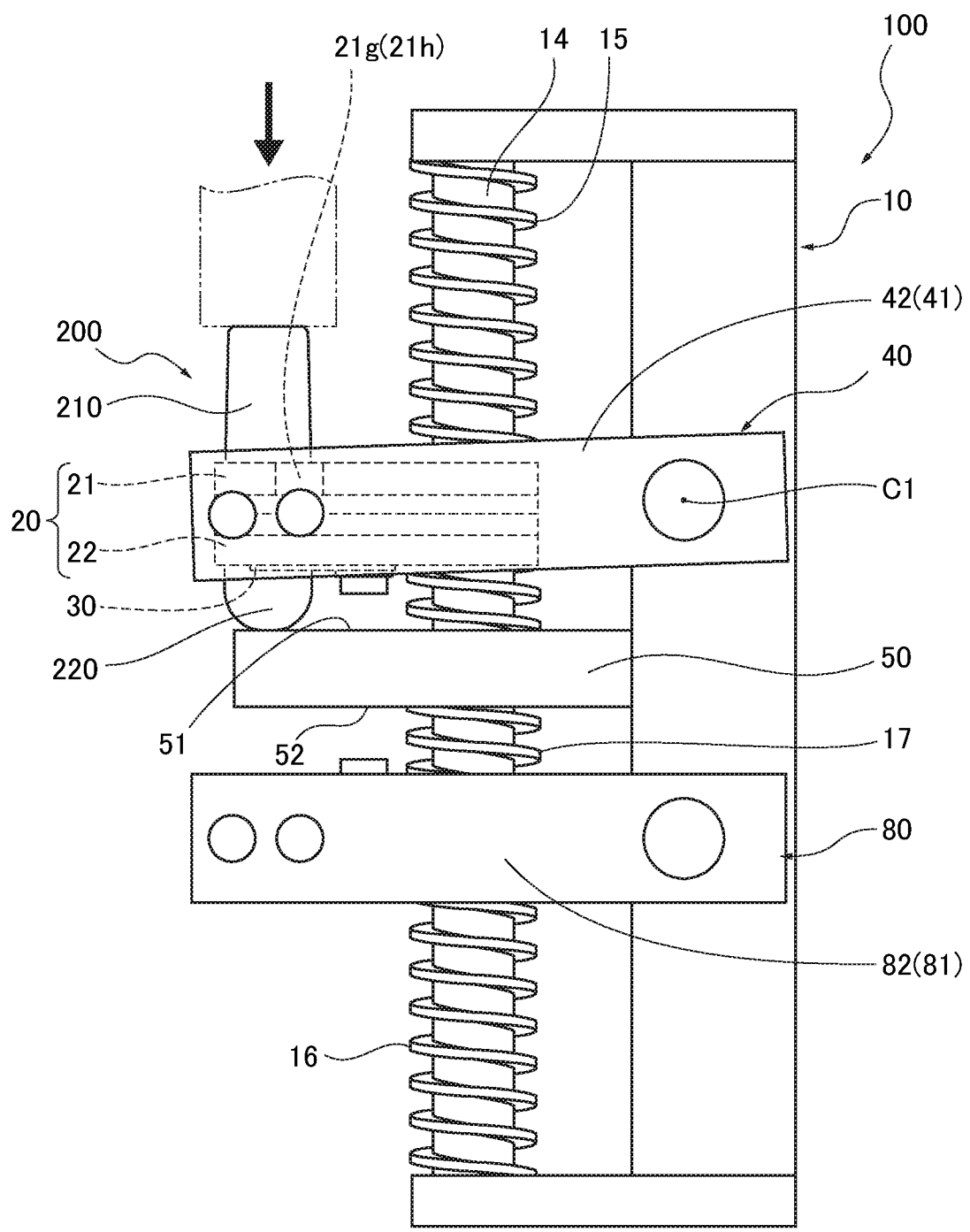
FIG. 6 is a side view illustrating a motion to attach the electrode tip held by the replacing and holding device to the shank fixed to the gun arm of the welding gun.

Specifically, FIG. 2 is a side view illustrating a state before removing the electrode tip 220 from the shank 210 fixed to the gun arm of the welding gun 200. FIG. 3 is a side view illustrating a state where the gun arm of the welding gun 200 is set to the replacing and holding device 100. FIG. 4 is a side view illustrating an upward motion of the welding gun 200 to pull out and remove the electrode tip 220. FIG. 5 is a side view illustrating a state where the electrode tip 220 removed from the shank 210 fixed to the gun arm of the welding gun 200 is held by the replacing and holding device 100. FIG. 6 is a side view illustrating a motion to attach the electrode tip 220 held by the replacing and holding device 100 to the shank 210 fixed to the gun arm of the welding gun 200.

The replacing and holding device 100 for the electrode tip 220 illustrated in FIGS. 2 to 6 is an embodiment of the replacing and holding device for the electrode tip according to the present disclosure.

As illustrated in FIGS. 2 to 4, the replacing and holding device 100 removes the electrode tip 220, which is frictionally fitted into the leading end of the shank 210 fixed to the gun arm of the welding gun 200, from the welding gun 200 used for resistance welding. Furthermore, as illustrated in FIGS. 4 and 5, the replacing and holding device 100 holds the removed electrode tip 220. Also, as illustrated in FIGS. 5 and 6, the replacing and holding device 100 is used to attach the electrode tip 220 to the shank 210 fixed to the gun arm of the welding gun 200.

Figure 7:
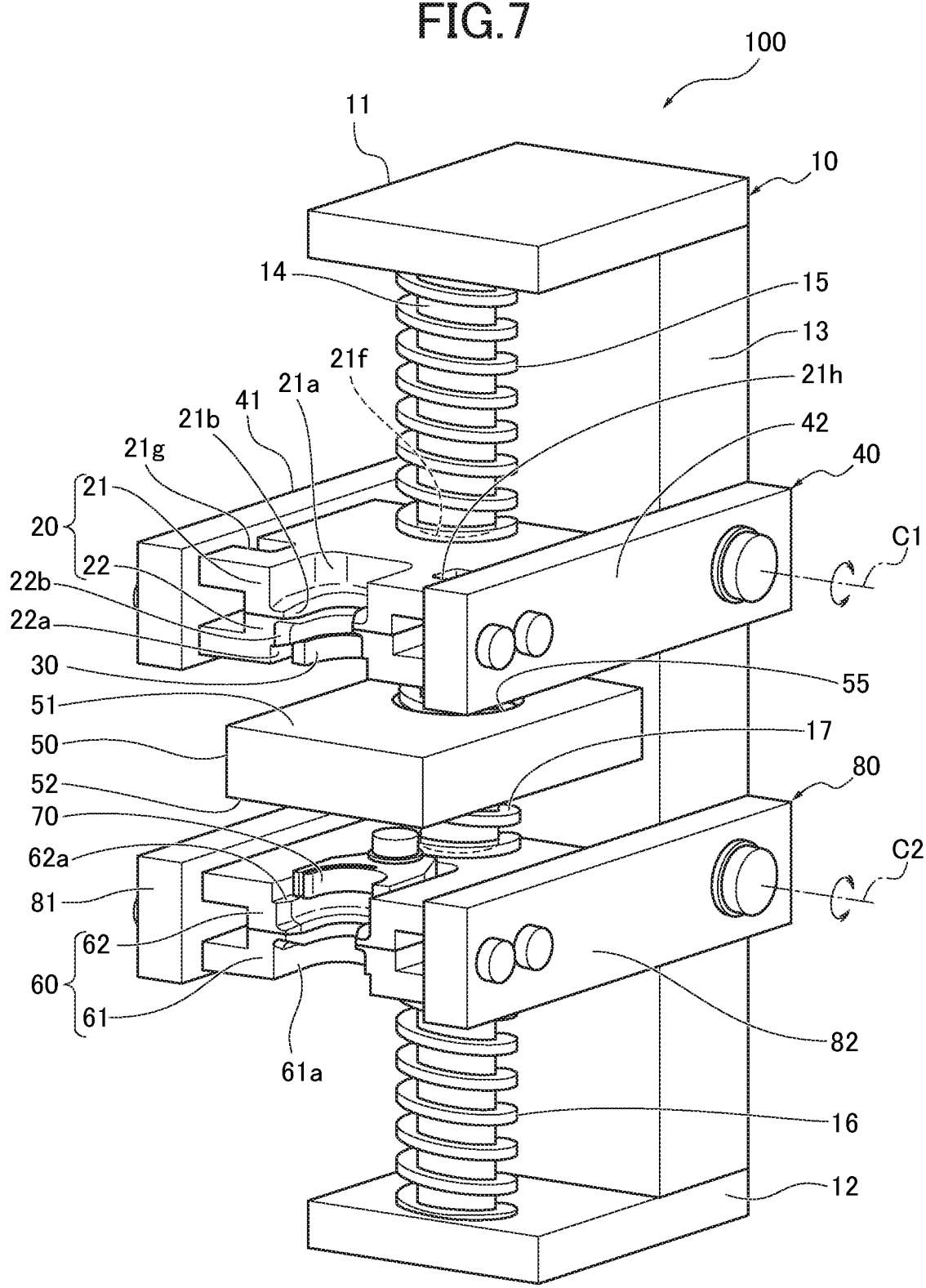
FIG. 7 is a perspective view illustrating a configuration of the replacing and holding device.

FIG. 7 is a perspective view illustrating a configuration of the replacing and holding device 100. As illustrated in FIG. 7, the replacing and holding device 100 for the electrode tip 220 includes a base 10, an upper electrode tip puller 20, an upper electrode tip holder 30, an upper rotating arm portion 40, an electrode tip contact portion 50, a lower electrode tip puller 60, a lower electrode tip holder 70, and a lower rotating arm portion 80.

The base 10 includes a support 13, an upper plate 11, a lower plate 12, and a guide rod 14. The support 13 extends in a vertical direction of the drawing. The upper plate 11 is fixed to an upper end face of the support 13 and horizontally extends forward from the upper end face of the support 13. The lower plate 12 is fixed to a lower end face of the support 13 and horizontally extends forward from the lower end face of the support 13.

The guide rod 14 extends parallel to the support 13 in the vertical direction of the drawing between a forward part of the upper plate 11 protruding from the support 13 and a forward part of the lower plate 12 protruding from the support 13. The guide rod 14 has a columnar shape. The guide rod 14 guides the movement of an upper pick plate 21 and a lower pick plate 22 which are stacked upon each other as well as the movement of an upper pick plate 62 and a lower pick plate 61 which are stacked upon each other in a stacking direction, which is described in detail below.

An upper coil spring 15, a middle coil spring 17, and a lower coil spring 16 are disposed around the guide rod 14 in this order from the top. The upper coil spring 15 is identical to the lower coil spring 16. The middle coil spring 17 has an elastic modulus, for example, twice the elastic modulus of the upper coil spring 15 and the lower coil spring 16. The elastic modulus of the middle coil spring 17 is not limited to the value twice the elastic modulus of the upper coil spring 15 and the lower coil spring 16.

The upper coil spring 15 is disposed between the upper plate 11 and the upper pick plate 21 of the upper electrode tip puller 20, which is described below. The upper coil spring 15 includes an upper end in contact with a bottom face of the upper plate 11 and a lower end in contact with a top face of the upper pick plate 21.

The lower coil spring 16 is disposed between the lower plate 12 and the lower pick plate 61 of the lower electrode tip puller 60, which is described below. The lower coil spring 16 includes a lower end in contact with a top face of the lower plate 12 and an upper end in contact with a bottom face of the lower pick plate 61.

The middle coil spring 17 penetrates the electrode tip contact portion 50, which is described below and is disposed between the lower pick plate 22 of the upper electrode tip puller 20 and the upper pick plate 62 of the lower electrode tip puller 60. The middle coil spring 17 includes an upper end in contact with a bottom face of the lower pick plate 22 and a lower end in contact with a top face of the upper pick plate 62.

Note that the upper coil spring 15 and the middle coil spring 17 may be compressed by predetermined lengths from their natural lengths to hold the upper electrode tip puller 20 at a predetermined height by a balance between an elastic force of the upper coil spring 15 and an elastic force of the middle coil spring 17. At the predetermined height where the upper electrode tip puller 20 is to be held, the upper rotating arm portion 40 is in a horizontal position.

Similarly, the lower coil spring 16 and the middle coil spring 17 may be compressed by predetermined lengths from their natural lengths to hold the lower electrode tip puller 60 at a predetermined height by a balance between an elastic force of the lower coil spring 16 and that of the middle coil spring 17. At the predetermined height where the lower electrode tip puller 60 is to be held, the lower rotating arm portion 80 is in a horizontal position.

The electrode tip contact portion 50 is placed at an intermediate position in the vertical direction of the drawing between the upper plate 11 and the lower plate 12. Also, the electrode tip contact portion 50 is placed between the forward part of the upper plate 11 and the forward part of the lower plate 12. The electrode tip contact portion 50 has a back end fixed to the support 13 and horizontally extends forward. The electrode tip contact portion 50 is parallel to the upper plate 11 and the lower plate 12 and does not move relative to the base 10.

When the electrode tip 220 held by the upper electrode tip holder 30, which is described below, is attached to the shank 210 fixed to the leading end of the gun arm of the welding gun 200, a lower end of the electrode tip 220 pushed downward by a downward motion of the welding gun 200 comes into contact with a top face 51 of the electrode tip contact portion 50 as illustrated in FIG. 6. In other words, the electrode tip contact portion 50 is located in front of the shank 210 in an inserting direction.

When the electrode tip held by the lower electrode tip holder 70, which is described below, is attached to the shank 210 fixed to a leading end of a gun arm of a lower welding gun (not shown), the upper end of the electrode tip pushed upward by an upward motion of the welding gun comes into contact with a bottom face 52 of the electrode tip contact portion 50.

The electrode tip contact portion 50 includes a hole 55 through which the guide rod 14 and the middle coil spring 17 extend in the axial direction of the guide rod 14. The guide rod 14 and the middle coil spring 17 are disposed to extend through the hole 55.

Figure 8:
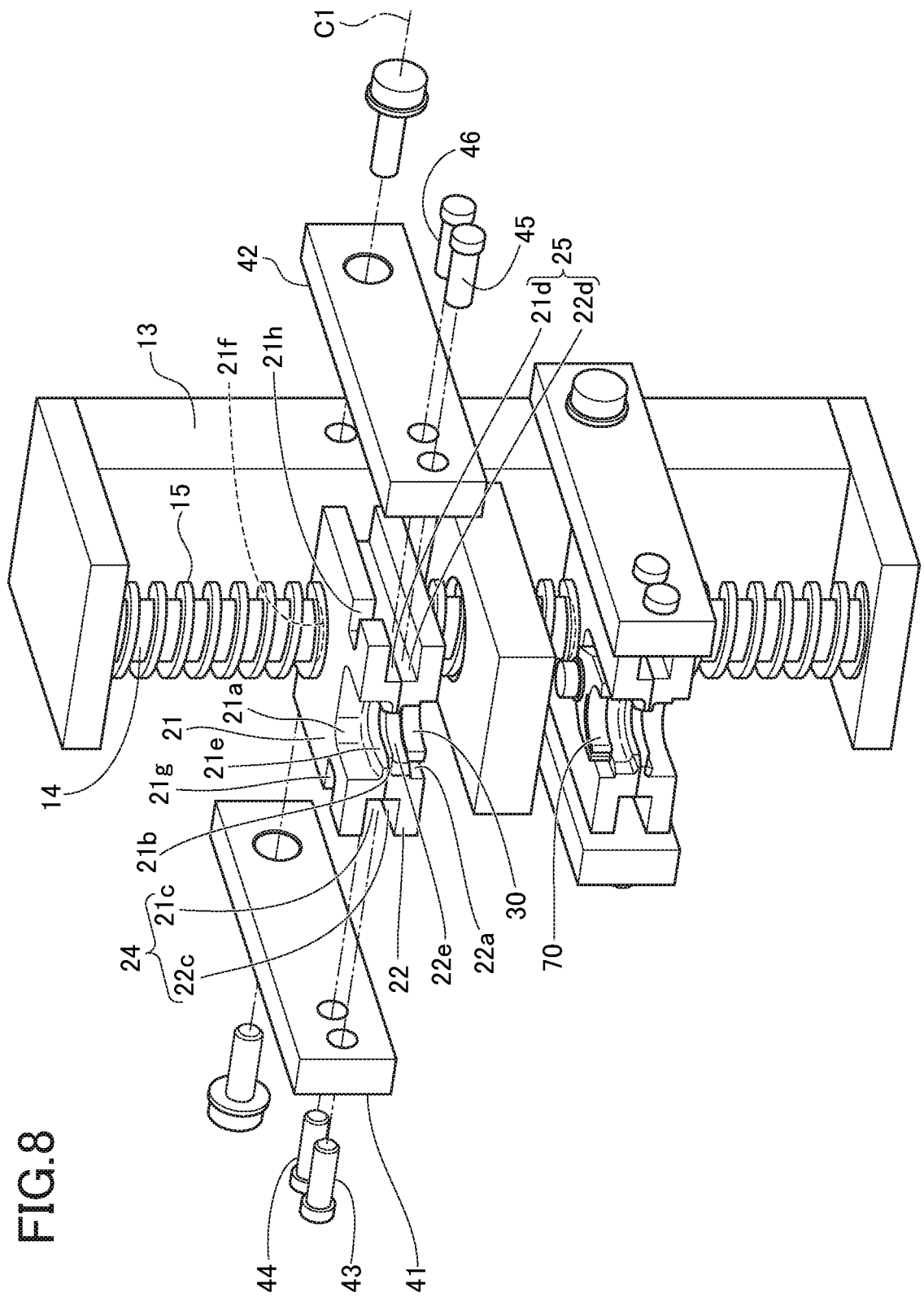
FIG. 8 is a schematic view illustrating a state where right and left arms of an upper rotating arm portion are virtually separated from a support in the replacing and holding device in FIG. 7.
Figure 9:
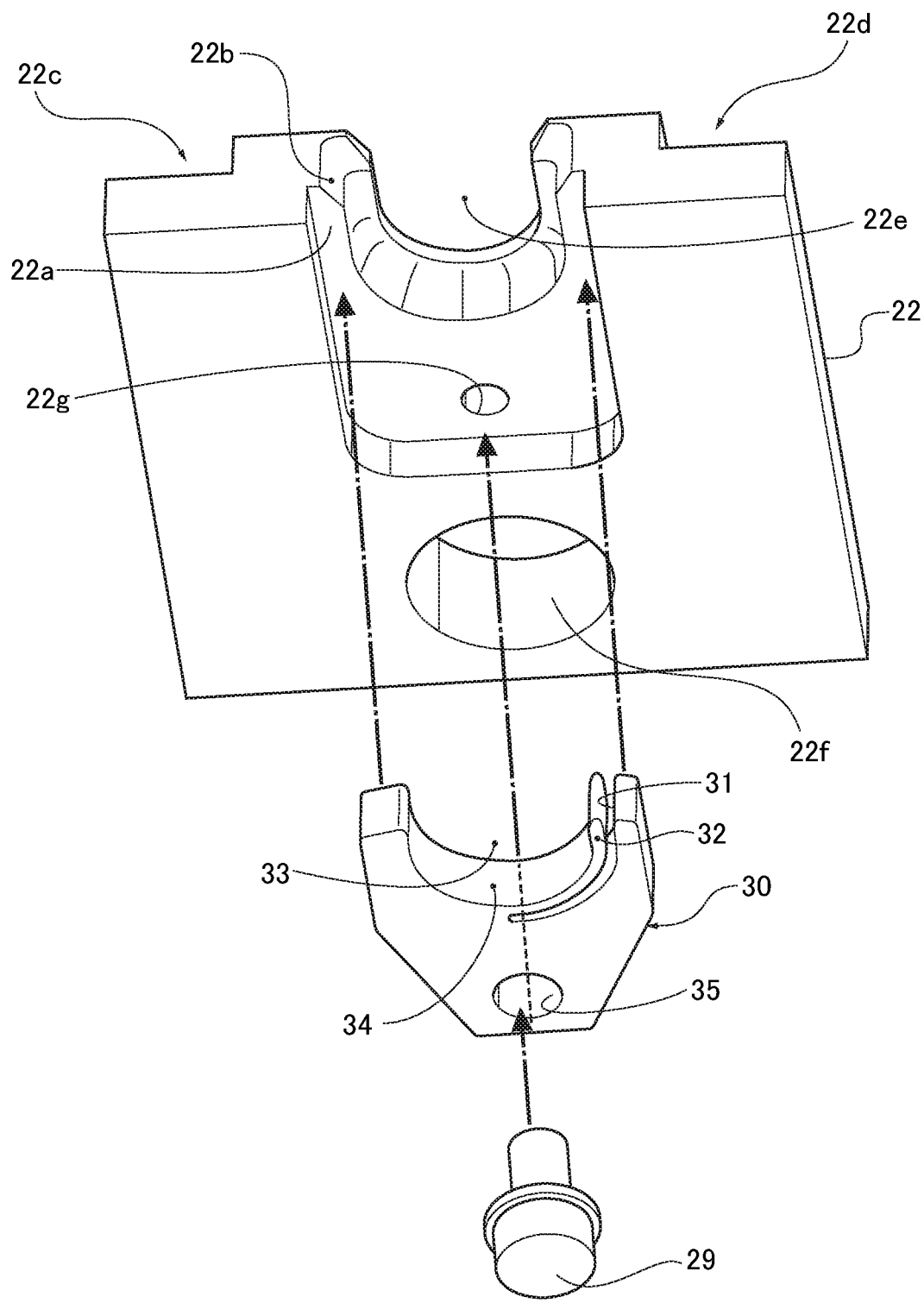
FIG. 9 is an exploded perspective view illustrating a lower pick plate and an electrode tip holder.

The upper electrode tip puller 20 includes the upper pick plate 21 and the lower pick plate 22. FIG. 8 is a schematic view illustrating a state where a right arm 41 and a left arm 42, which are described below, of the upper rotating arm portion 40 is virtually separated from the support 13 in the replacing and holding device 100 shown in FIG. 7. FIG. 9 is an exploded perspective view illustrating the lower pick plate 22 and the upper electrode tip holder 30.

The upper pick plate 21 includes a substantially semicircular cutout 21a in a leading end (on the side farther from the support 13) thereof. The upper pick plate 21 also includes a hole 21f in a portion closer to the back side (i.e., the side closer to the support 13). The guide rod 14 extends through the hole 21f in a thickness direction of the upper pick plate 21. The hole 21f has an inner diameter slightly larger than the outer diameter of the guide rod 14 so that there is almost no gap between the hole 21f and the guide rod 14.

Thereby, the upper pick plate 21 moves up and down along the guide rod 14 while being maintained in the horizontal position. The hole 21f is smaller than the outer diameter of the upper coil spring 15 so that the lower end of the upper coil spring 15 contacts the top face of the upper pick plate 21.

In the cutout 21a of the upper pick plate 21, a lower portion in the thickness includes a flange 21b extending toward the inside of the cutout 21a. The flange 21b surrounds a semi-circular void or space 21e. The space 21e has a width (in the leading end face) that allows the insertion of the smaller diameter portion 211 of the shank 210 (having the outer diameter d5) illustrated in FIG. 1 and does not allow the insertion of the larger diameter portion 213 of the shank 210 (having the outer diameter d6). The cutout 21a has a width (in the leading end face) that allows the insertion of the larger diameter portion 213.

Furthermore, lower portions of the upper pick plate 21 include cutouts 21c and 21d at both sides of the upper pick plate 21, respectively. The cutouts 21c and 21d extend in a straight line in a front-back direction that connects the leading end and a shaft C1. The right-side cutout 21c forms a groove 24 together with a right-side cutout 22c of the lower pick plate 22. Pins 43 and 44 of the right arm 41, which are described below, are inserted into the groove 24. The left-side cutout 21d forms a groove 25 together with a left-side cutout 22d of the lower pick plate 22. Pins 45 and 46 of the left arm 42 are inserted into the groove 25.

Run-off portions 21g and 21h are provided at predetermined locations in the front-back direction of the cutouts 21c and 21d which extend in the front-back direction. The run-off portions 21g and 21h are spaces formed by extending the cutouts 21c and 21d upward.

Specifically, the run-off portion 21g is formed above a position where the back pin 44 of the right arm 41 is placed and the run-off portion 21h is formed above a position where the back pin 46 of the left arm 42 is placed. The run-off portions 21g and 21h according to this embodiment penetrate the top face of the upper pick plate 21 from the cutouts 21c and 21d.

A motion of the welding gun 200 to insert the electrode tip 220 held by the upper electrode tip holder 30, which is described below, into the shank 210 causes a difference in height between the two pins 43 (45) and 44 (46). The run-off portions 21g and 21h are structures that retract the back pins 44 and 46 to prevent the upper pick plate 21 from being pressed relatively upward by contacting the back pins 44 and 46 and to prevent the upper pick plate 21 and the lower pick plate 22 which are stacked in contact with each other by the upper coil spring 15 and the middle coil spring 17 from being separated in the vertical direction. Note that actions of the run-off portions 21g and 21h to prevent the separation between the upper pick plate 21 and the lower pick plate 22 will be described later.

As illustrated in FIG. 9, similarly to the upper pick plate 21, the lower pick plate 22 includes a substantially semicircular cutout 22a at a leading end thereof. The lower pick plate 22 also includes a hole 22f in a portion closer to the rear side thereof. The guide rod 14 extends through the hole 22f in the thickness direction of the lower pick plate 22. The hole 22f also has an inner diameter slightly larger than the outer diameter of the guide rod 14 so that there is almost no gap between the hole 22f and the guide rod 14.

Accordingly, the lower pick plate 22 is capable of moving up and down along the guide rod 14 while being maintained in a horizontal position. Furthermore, the hole 22f is smaller than the outer diameter of the middle coil spring 17 so that the upper end of the middle coil spring 17 contacts the bottom face of the lower pick plate 22.

The upper electrode tip puller 20 and the lower electrode tip puller 60 remain in a stationary state vertically symmetrical with the electrode tip contact portion 50 therebetween.

In a stationary state where an external force (excluding gravity) is not applied, the upper pick plate 21 and the lower pick plate 22 remain in the stationary state by being stacked to contact each other.

In the cutout 22a of the lower pick plate 22, an upper portion in the thickness direction is provided with a flange 22b that extends toward the inside of the cutout 22a. The flange 22b surrounds a semi-circular void or space 22e having a width (width in a leading end face) that allows insertion of the smaller diameter portion 211 of the shank 210 and does not allow insertion of the outer peripheral portion 221 (outer diameter d4) of the electrode tip 220.

Note that the cutout 22a is larger than the outer peripheral portion 221 of the electrode tip 220 and has a width (width in the leading end face) wider than that of the upper electrode tip holder 30, which is described below. Furthermore, upper portions of the lower pick plate 22 include cutouts 22c and 22d at both sides of the lower pick plate 22, respectively. The cutouts 22c and 22d extend in a straight line in the front-back direction.

As illustrated in FIG. 8, in the contact state where the upper pick plate 21 and the lower pick plate 22 are stacked with each other, the space 21e and the space 22e overlap in the vertical direction. The flange 21b and the flange 22b are designed to have a combined thickness slightly smaller than an axial length between the end face 212 of the larger diameter portion 213 and the end face 222 of the electrode tip 220 when the flange 21b and 22b contact each other in the vertical direction. In other words, this axial length is an axial length of the smaller diameter portion 211 of the shank 210 while the electrode tip 220 is attached.

Furthermore, in the contact state where the upper pick plate 21 and the lower pick plate 22 are stacked with each other as illustrated in FIG. 8, the right-side cutouts 21c and 22c facing the right arm 41 form the groove 24 having a predetermined width extending horizontally in the front-back direction, and the left-side cutouts 21d and 22d facing the left arm 42 form the groove 25 having a predetermined width extending horizontally in the front-back direction. The grooves 24 and 25 are formed at the same height position and with the same width.

Figure 10:
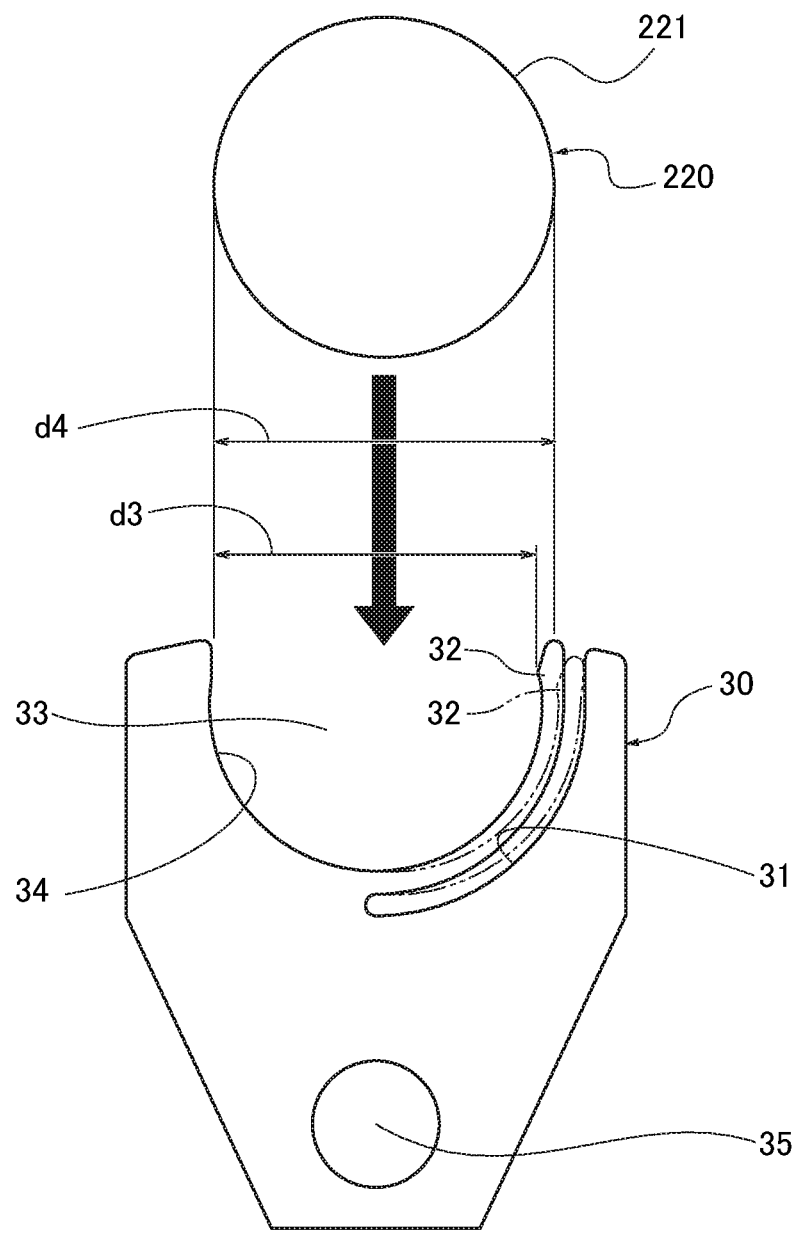
FIG. 10 is a bottom view illustrating an upper electrode tip holder.

FIG. 10 is a bottom view of the upper electrode tip holder 30. As illustrated in FIG. 9, the upper electrode tip holder 30 is disposed in the cutout 22a formed in the lower pick plate 22 of the upper electrode tip puller 20. A fixing hole 35 is formed in the upper electrode tip holder 30 and a bolt hole 22g is formed in the lower pick plate 22. A bolt 29 extends through the fixing hole 35 and is engaged with the bolt hole 22g, whereby the upper electrode tip holder 30 is fixed to the lower pick plate 22.

The upper electrode tip holder 30 includes a semicircular cutout 33 at a leading end thereof. The cutout 33, which is disposed below the space 22e of the lower pick plate 22, has a width wider than that of the space 22e when the upper electrode tip holder 30 is fixed to the lower pick plate 22.

Specifically, as illustrated in FIG. 10, a width d3 of the cutout 33 is smaller than the outer diameter d4 of the outer peripheral portion 221 of the electrode tip 220.

The upper electrode tip holder 30 includes a groove 31 in the radially outer side thereof. The groove 31 is concentric with a peripheral edge 34 provided outside the cutout 33 and has a length that is about one-fourth (¼) of the circumference from the leading end of the upper electrode tip holder 30. Thereby, an arc portion 32 (elastically deformable portion) having an angle range of about one-fourth of a circle is formed between the groove 31 and the cutout 33.

The upper electrode tip holder 30 is formed with metal. Accordingly, the arc portion 32 is deformable as shown by dashed-two dotted lines in FIG. 10 with the leading end of the upper electrode tip holder 30 as a free end. When the electrode tip 220 is inserted into the cutout 33, the outer peripheral portion 221 of the electrode tip 220 pushes the arc portion 32 radially outward and deforms the arc portion 32, thereby the width of the cutout 33 is increased to a size equal to the outer diameter d4 of the outer peripheral portion 221 of the electrode tip 220.

Accordingly, an elastic force is generated in the upper electrode tip holder 30 to recover the elastic deformation. This elastic force causes a centripetal normal force acting on the outer peripheral portion 221 of the electrode tip 220 and causes a frictional force between the peripheral edge 34 and the outer peripheral portion 221 of the electrode tip 220. In addition, this frictional force causes the upper electrode tip holder 30 to clasp and hold the electrode tip 220.

Note that the upper electrode tip holder 30 is not limited to one formed with an elastically deformable metal. In other words, the upper electrode tip holder 30 may be formed with an elastically deformable material such as hard rubber.

As illustrated in FIGS. 7 and 8, the upper rotating arm portion 40 (pick plate interspace increasing mechanism) includes the right arm 41 disposed on the right side of the support 13 and the left arm 42 disposed on the left side of the support 13. The right arm 41 and the left arm 42 are supported by the support 13 at respective ends (rear ends) thereof to rotate about the shaft C1 extending horizontally.

Furthermore, the right arm 41 and the left arm 42 are supported by the support 13 at positions at the same height as the upper electrode tip puller 20 that remains in a stationary state at a predetermined position in the vertical direction.

The two pins 43 and 44 aligned in the length direction of the right arm 41 are fixed to the front or leading side of the right arm 41 opposite to the end (rear end) supported by the shaft C1. The pins 43 and 44 are provided to extend toward the left arm 42. The pins 43 and 44 are formed in the shape of a column and have the same outer diameter. The outer diameter of the pins 43 and 44 is slightly smaller than the width of the groove 24 in a state where the upper pick plate 21 and the lower pick plate 22 of the upper electrode tip puller 20 contact with each other. The first pin 43 is disposed at the front side of the right arm 41 closer to the leading end of the right arm 41, and the second pin 44 is disposed behind the first pin 43 closer to the shaft C1.

The two pins 43 and 44 are inserted into the groove 24. The pin 43, the pin 44, and the shaft C1 which connects the right arm 41 to the support 13 are always aligned with each other in a straight line. When the upper electrode tip puller 20 remains in a stationary state at the predetermined position in the vertical direction as illustrated in FIG. 2, the right arm 41 extends in the horizontal direction and the pin 43, the pin 44, and the shaft C1 are aligned in the horizontal direction.

The two pins 45 and 46 aligned in the length direction of the left arm 42 are fixed to the front side of the left arm 42. These pins 45 and 46 extend toward the right arm 41. The pins 45 and 46 are formed in the shape of a column and have the same outer diameter. The outer diameter of the pins 45 and 46 is slightly smaller than the width of the groove 25 in a state where the upper pick plate 21 and the lower pick plate 22 of the upper electrode tip puller 20 contact with each other. The first pin 45 is disposed at the front side of the left arm 42 closer to the leading end of the left arm 42, and the second pin 46 is disposed behind the pin 45.

The two pins 45 and 46 are inserted into the groove 25. The pin 45, the pin 46, and the shaft C1 which connects the left arm 42 to the support 13 are always aligned with each other in a straight line. When the upper electrode tip puller 20 remains in a stationary state at the predetermined position in the vertical direction as illustrated in FIG. 2, the left arm 42 extends in the horizontal direction and the pin 45, the pin 46, and the shaft C1 are aligned in the horizontal direction.

Rotating the right arm 41 and the left arm 42 about the horizontal shaft C1 to incline the leading ends upward from horizontal positions causes height differences in heights between the pin 43 and the pin 44 and between the pin 45 and the pin 46. Specifically, the front pin 43 is located higher than the back pin 44, and the front pin 45 is located higher than the back pin 46.

On the other hand, the upper pick plate 21 and the lower pick plate 22 are maintained in the horizontal positions by being guided along the guide rod 14. With this configuration, the front pins 43 and 45 located higher than the back pins 44 and 46 press the upper pick plate 21 relatively upward even while the grooves 24 and 25 have a constant height in the height direction. Accordingly, a gap or space between the upper pick plate 21 and the lower pick plate 22 is increased in accordance with their positions along the guide rod 14 to separate the upper pick plate 21 and the lower pick plate 22 which are stacked in contact with each other.

The lower electrode tip puller 60 includes the lower pick plate 61, the upper pick plate 62, and a cover. The lower electrode tip puller 60 and the upper electrode tip puller 20 are symmetrical and operate symmetrically with the electrode tip contact portion 50 therebetween with respect to the horizontal line (in the vertical direction). Accordingly, the lower electrode tip puller 60 will not be described in detail.

The lower electrode tip holder 70 is fixed to the upper pick plate 62 of the lower electrode tip puller 60. The lower electrode tip holder 70 and the upper electrode tip holder 30 are symmetrical and operate symmetrically with respect to the horizontal line (in the vertical direction). Accordingly, the lower electrode tip holder 70 will not be described in detail.

As illustrated in FIGS. 7 and 8, the lower rotating arm portion 80 (pick plate interspace increasing mechanism) includes a right arm 81 disposed on the right side of the support 13 and a left arm 82 disposed on the left side of the support 13. The lower rotating arm portion 80 and the upper rotating arm portion 40 are symmetrical and operate symmetrically with respect to the horizontal line (in the vertical direction). Accordingly, the lower rotating arm portion 80 will not be described in detail.

Hereinafter actions of the replacing and holding device 100 for the electrode tip according to this embodiment are described.

Figure 11:
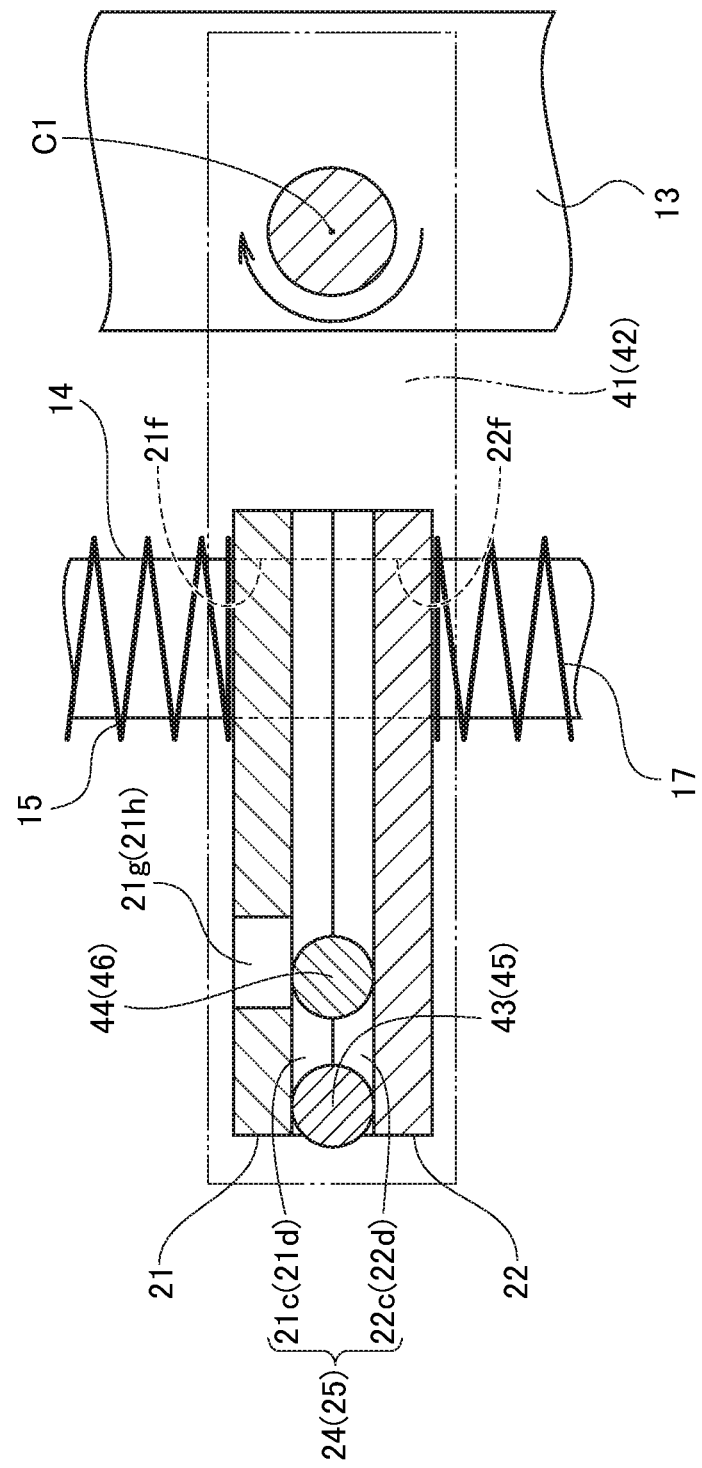
FIG. 11 is a cross-sectional view in a vertical direction viewed from a side, the view corresponding to FIGS. 2 and 3 and illustrating the positional relationship among pins, the upper pick plate, and the lower pick plate when the upper rotating arm portion is in a horizontal position.
Figure 12:
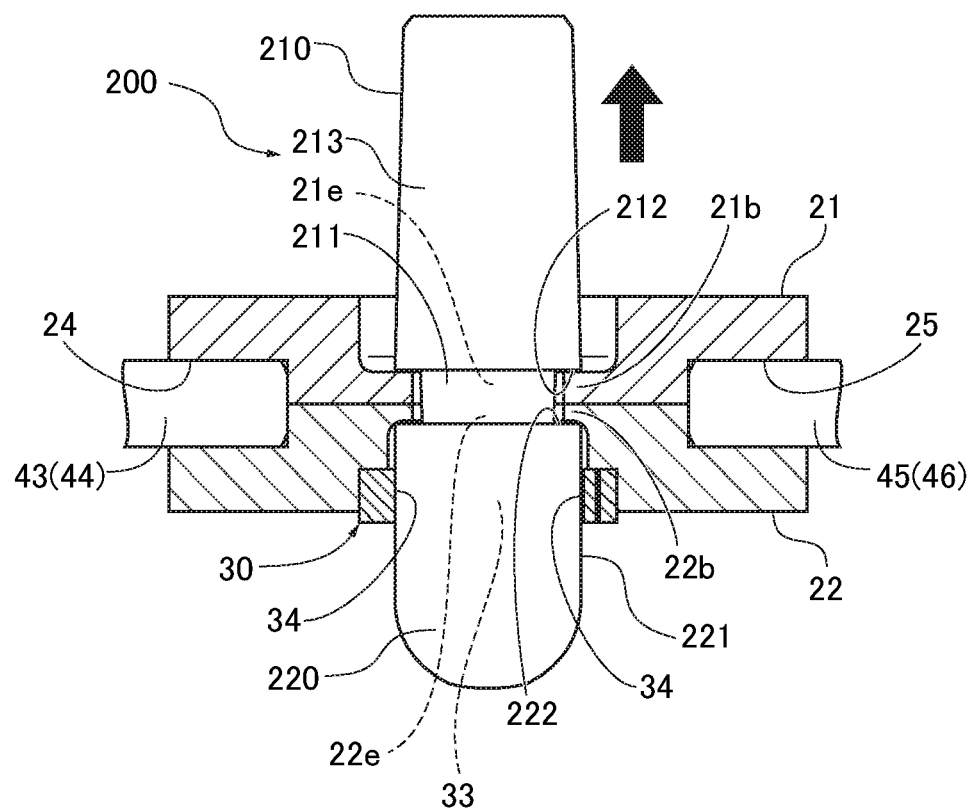
FIG. 12 is a front view corresponding to FIG. 3 and illustrating the positional relationship among the upper pick plate, the lower pick plate, and a smaller diameter portion of the shank.

FIG. 11 is a cross-sectional view of the main parts corresponding to FIGS. 2 and 3 viewed from a side, illustrating the positional relationship among the pins 43 (45), 44 (46), the upper pick plate 21, and the lower pick plate 22 when the upper rotating arm portion 40 is in the horizontal position. FIG. 12 is a front view corresponding to FIG. 3 viewed from the leading ends of the upper pick plate 21 and the lower pick plate 22, illustrating the positional relationship among the upper pick plate 21, the lower pick plate 22, and the smaller diameter portion 211 of the shank 210.

Figure 13:
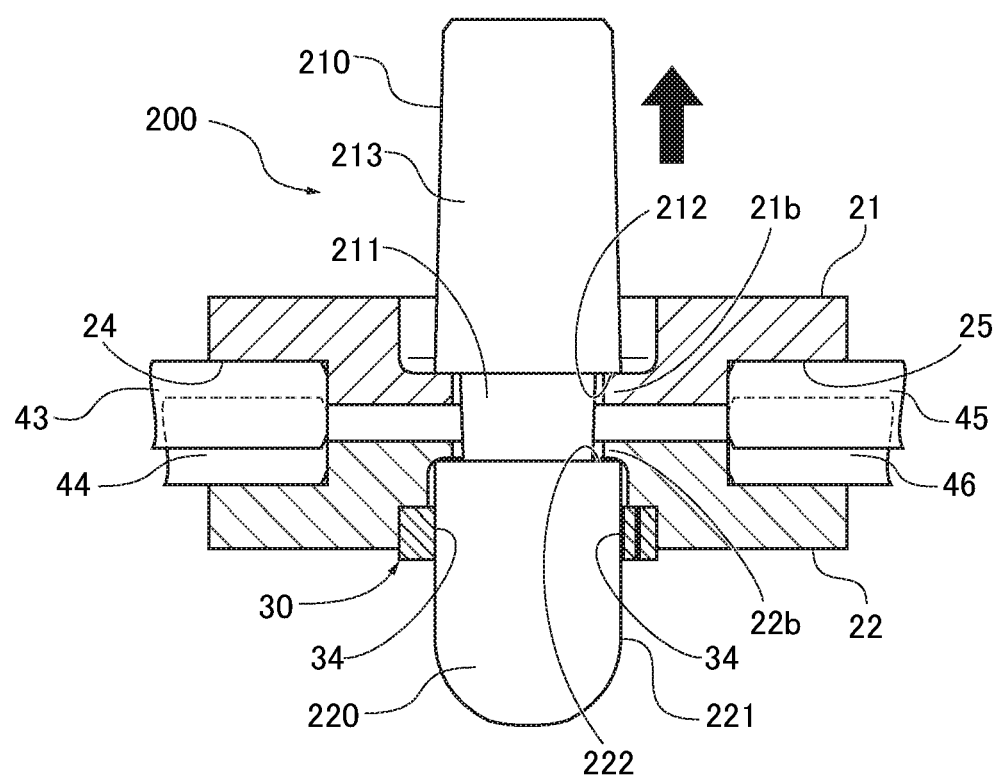
FIG. 13 is a front view corresponding to FIG. 4 and illustrating a state where the end face of the electrode tip pushes a flange of the lower pick plate upward.
Figure 14:
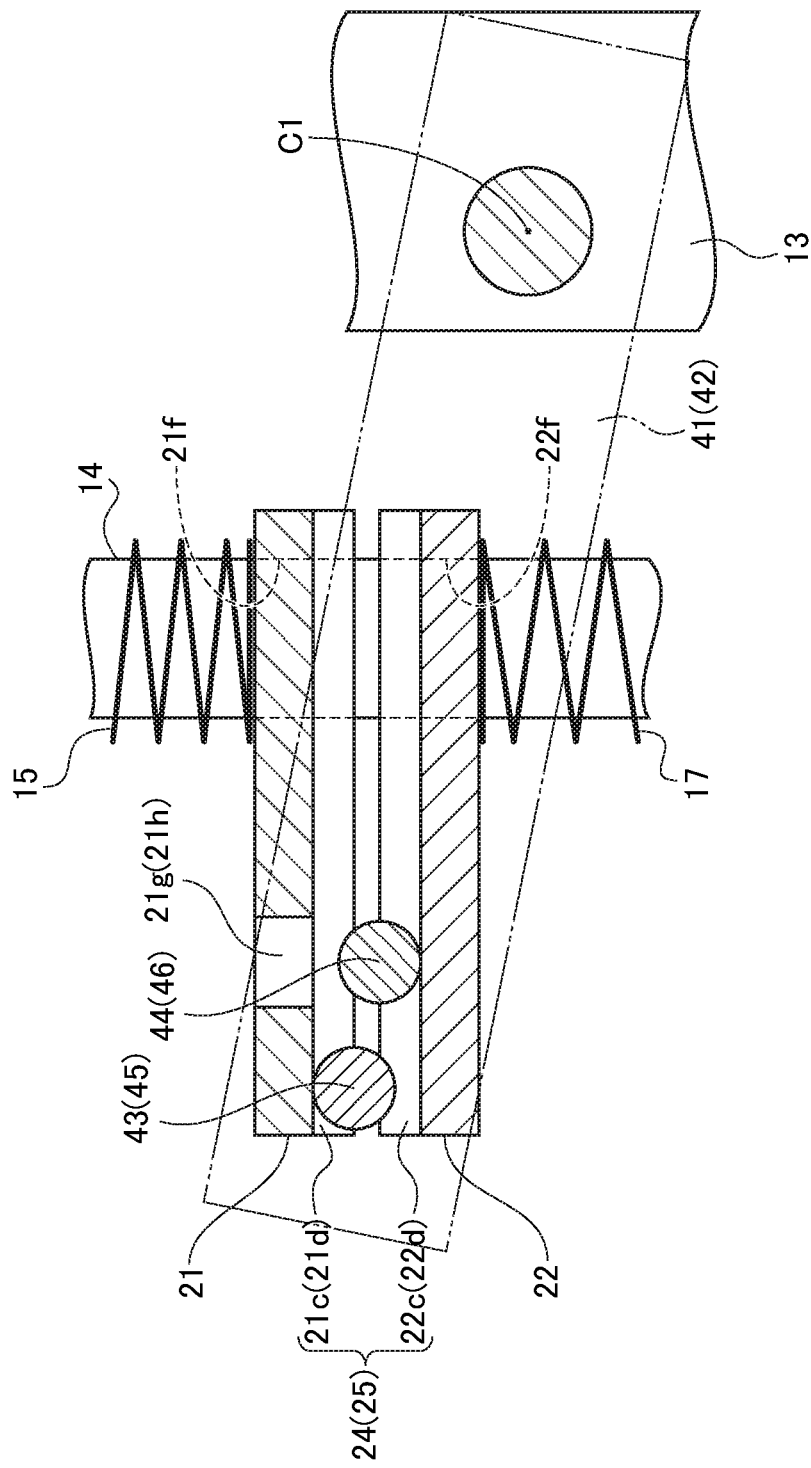
FIG. 14 is a cross-sectional view in a vertical direction viewed from a side, the view corresponding to FIG. 13 and illustrating the positional relationship among the pins, the upper pick plate, and the lower pick plate when a rotatable end of the upper rotating arm portion on the opposite side of a shaft C1 across the pins (hereinafter referred to as "leading end") inclines to be higher than the shaft C1.

FIG. 13 is a front view corresponding to FIG. 4 viewed from the leading ends of the upper pick plate 21 and the lower pick plate 22, illustrating a state where the end face 222 of the electrode tip 220 pushes the flange 22b of the lower pick plate 22 upward. FIG. 14 is a cross-sectional view of the main parts corresponding to FIG. 13 viewed from a side, illustrating the positional relationship among the pins 43 (45) and 44 (46), the upper pick plate 21, the lower pick plate 22 when a rotatable end (hereinafter referred to as "leading end") of the upper rotating arm portion 40 on the opposite side of the shaft C1 across the pins 43 and 44 inclines to be higher than the shaft C1.

Figure 15:
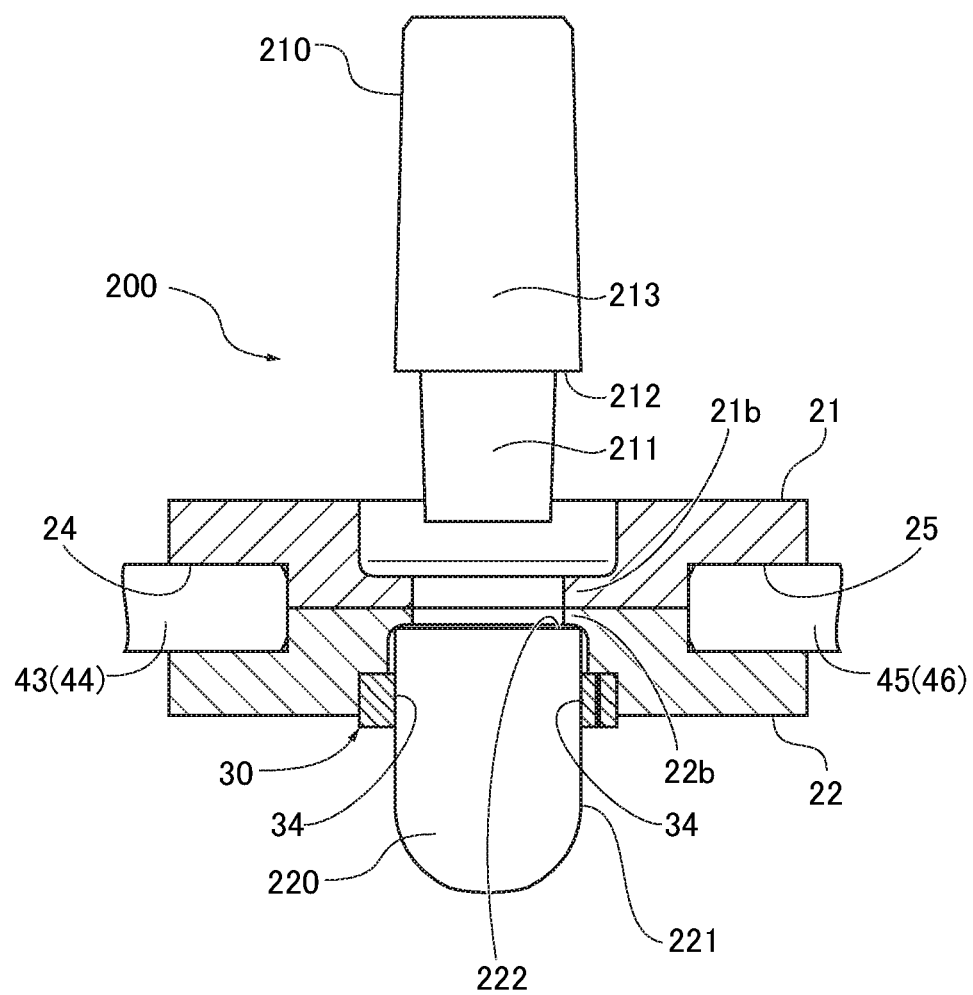
FIG. 15 is a front view corresponding to FIG. 5 and illustrating the positional relationship among the upper pick plate, the lower pick plate, the shank, and the electrode tip.

FIG. 15 is a front view corresponding to FIG. 5 viewed from the front, illustrating the positional relationship among the upper pick plate 21, the lower pick plate 22, the shank 210, and the electrode tip 220.

First, as illustrated in FIG. 2, an action to remove the electrode tip 220 attached to the shank 210 of the welding gun 200 will be described. As illustrated in FIG. 3, due to the motion of the welding gun 200, the welding gun 200 moves toward the upper electrode tip puller 20.

At this time, as illustrated in FIG. 11, the upper pick plate 21 and the lower pick plate 22 of the upper electrode tip puller 20 are supported by the upper coil spring 15, the middle coil spring 17, and the lower coil spring 16 and are stacked in contact with each other to remain in a stationary state.

Furthermore, the right arm 41 and the left arm 42 of the upper rotating arm portion 40 are both in the horizontal positions. The pins 43 and 44 are located at the same height and inserted into the groove 24. The pins 45 and 46 are located at the same height and inserted into the groove 25.

As illustrated in FIG. 12, the smaller diameter portion 211 of the shank 210 enters the space 21e of the upper pick plate 21 and the space 22e of the lower pick plate 22 from the front side. In other words, the stacked upper pick plate 21 and the lower pick plate 22 are inserted between the end face 222 of the electrode tip 220 and the end face 212 of the larger diameter portion 213 of the shank 210.

At this time, the outer peripheral portion 221 of the electrode tip 220 enters the cutout 33 of the upper electrode tip holder 30 and is held by the upper electrode tip holder 30 by the frictional force relative to the peripheral edge 34 due to the elastic force of the arc portion 32.

From this state, the welding gun 200 moves vertically upward as illustrated in FIG. 4. This motion causes the end face 222 of the electrode tip 220 to push the flange 22b of the lower pick plate 22 upward as illustrated in FIG. 13. The lower pick plate 22 pushed upward moves vertically upward along the guide rod 14 against the elastic force of the upper coil spring 15 while being maintained in the horizontal position.

When the lower pick plate 22 moves upward, the pins 43 and 44 of the right arm 41 inserted into the groove 24 are moved upward by the lower pick plate 22, and the pins 45 and 46 of the left arm 42 inserted into the groove 25 are also moved upward by the lower pick plate 22.

Thereby, the right arm 41 and the left arm 42 rotate about the shaft C1, and the leading ends of the arms 41 and 42 are inclined to be higher than the shaft C1 as illustrated in FIG. 14. When the leading end of the right arm 41 is inclined to be higher than the shaft C1, the front pin 43 is located higher than the back pin 44. When the leading end of the left arm 42 is inclined to be higher than the shaft C1, the front pin 45 is located higher than the back pin 46.

Accordingly, the rising of the lower pick plate 22 in the horizontal position causes further inclination of the right arm 41 and the left arm 42. The front pins 43 and 45 relatively higher than the back pins 44 and 46 move further to reach higher positions to press the upper pick plate 21 vertically upward. At this time, the lower pick plate 22 is pressed downward by the back pins 44 and 46.

The more the angle of inclination of the right arm 41 and the left arm 42 increases from the horizontal positions, the wider the height difference between the front pins 43, 45 and the back pins 44, 46, and the upper pick plate 21 pressed upward by the front pins 43, 45 and the lower pick plate 22 pressed downward by the back pins 44, 46 are separated and move apart from each other in the vertical direction.

The separation between the upper pick plate 21 and the lower pick plate 22 brings the flange 21b of the upper pick plate 21 into contact with the end face 212 of the larger diameter portion 213 of the shank 210, and the end face 212 is pushed upward as illustrated in FIG. 13. On the other hand, the flange 22b of the lower pick plate 22 is in contact with the end face 222 of the electrode tip 220.

Accordingly, the increase of the gap between the upper pick plate 21 and the lower pick plate 22 increases the distance between the end face 212 of the shank 210 and the end face 222 of the electrode tip 220, thereby the electrode tip 220 is pulled out from the shank 210.

After the electrode tip 220 is pulled out from the shank 210 as illustrated in FIG. 5, the load that pulls the upper rotating arm portion 40 upward is eliminated. Due to the elastic force of the upper coil spring 15 which was elastically deformed by the upper pick plate 21 and moved upward, the upper pick plate 21 is pushed vertically downward and returns to the stationary state where the upper coil spring 15, the middle coil spring 17, and the lower coil spring 16 have their original lengths (FIGS. 2 and 3), that is, the right arm 41 and the left arm 42 return to their horizontal positions.

Here, the electrode tip 220 pulled out from the shank 210 and removed from the welding gun 200 is held by the upper electrode tip holder 30 without dropping as illustrated in FIGS. 5 and 15.

To the shank 210 fixed to the gun arm of the welding gun 200 from which the electrode tip 220 is removed, another electrode tip different from the electrode tip 220 in shape and material is attached by another replacing and holding device for the electrode tip different from the replacing and holding device 100.

Next, a motion to attach the electrode tip 220 held by the replacing and holding device 100 to the shank 210 fixed to the gun arm of the welding gun 200 after the different type of electrode tip is removed from the welding gun 200 is described.

Figure 16:
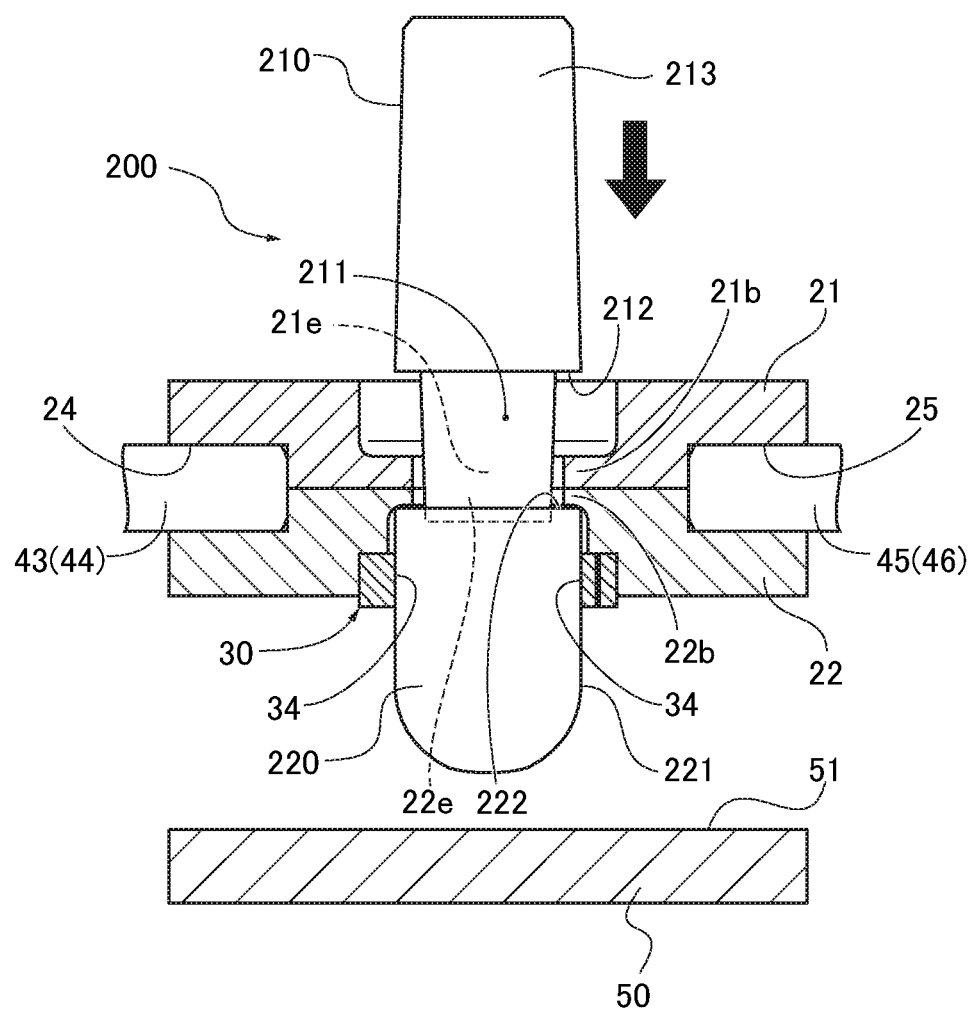
FIG. 16 is a front view illustrating a state where the smaller diameter portion of the shank begins to be inserted into the electrode tip held by the upper electrode tip holder.
Figure 17:
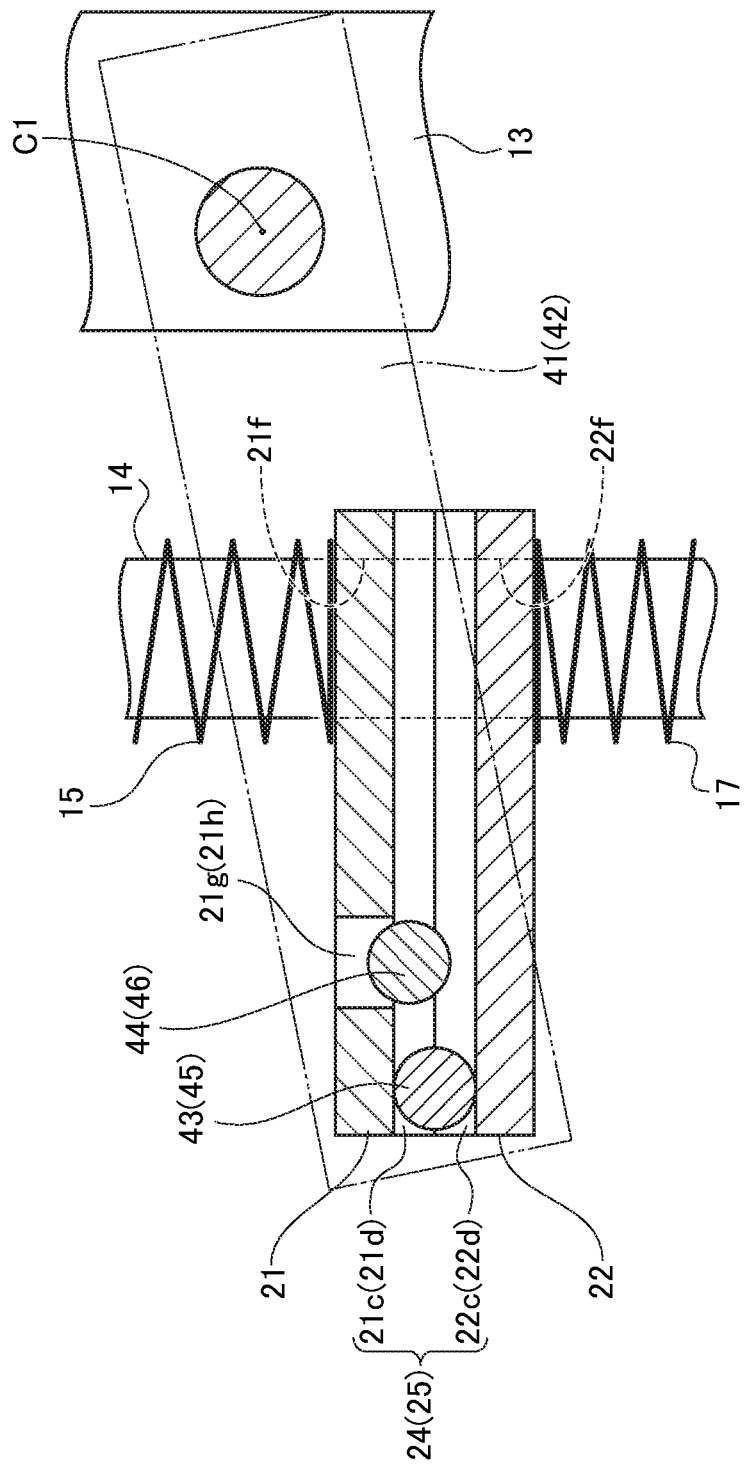
FIG. 17 is a cross-sectional view in a vertical direction viewed from a side, the view illustrating the positional relationship among the pins, the upper pick plate, and the lower pick plate while leading ends of the right arm and the left arm incline to be lower than the shaft C1.

FIG. 16 is a front view illustrating a state where the smaller diameter portion 211 of the shank 210 begins to be inserted into the electrode tip 220 held by the upper electrode tip holder 30. FIG. 17 is a cross-sectional view of the main parts viewed from a side, illustrating the positional relationship among the pins 43 (45) and 44 (46), the upper pick plate 21, and the lower pick plate 22 while the leading ends of the right arm 41 and the left arm 42 incline to be lower than the shaft C1.

Figure 18:
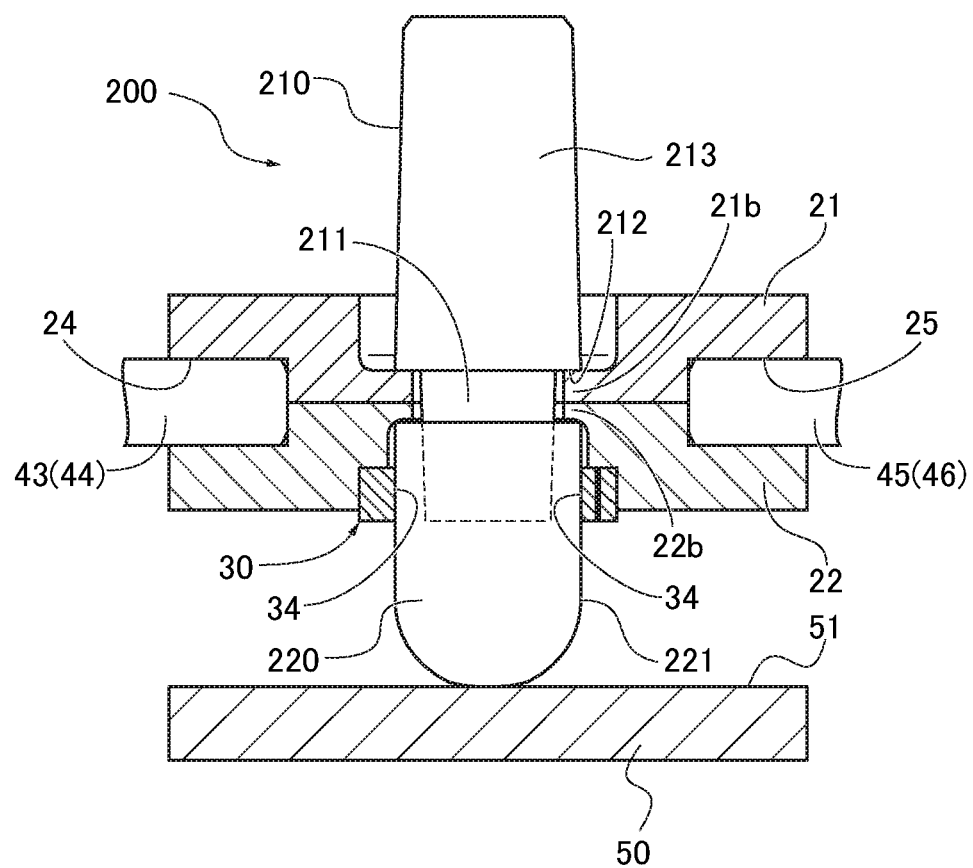
FIG. 18 is a front view illustrating a state where a lower end of the electrode tip held by the upper electrode tip holder comes into contact with a top face of an electrode tip contact portion.

FIG. 18 is a front view viewed from the front side, illustrating a state where the lower end of the electrode tip 220 held by the upper electrode tip holder 30 comes into contact with the top face 51 of the electrode tip contact portion 50.

As illustrated in FIG. 5, due to the motion of the welding gun 200, the welding gun 200 moves right above the spaces 21e and 22e of the upper electrode tip puller 20, and then, moves vertically downward from this position. As illustrated in FIG. 16, in the welding gun 200 moving vertically downward, the smaller diameter portion 211 of the shank 210 begins to be inserted into the electrode tip 220 held by the upper electrode tip holder 30. In this state, the connection or fitting between the smaller diameter portion 211 of the shank 210 inserted into the electrode tip 220 and the electrode tip 220 is not firm enough, and the smaller diameter portion 211 is loosely inserted into the electrode tip 220.

A further downward motion of the welding gun 200 pushes the electrode tip 220 downward by friction between the inserted smaller diameter portion 211 and the inner peripheral surface of the electrode tip 220, and the electrode tip 220 moves slightly downward relative to the upper electrode tip holder 30. Even in this state, the electrode tip 220 is still held by the upper electrode tip holder 30.

When the end face 212 of the larger diameter portion 213 comes into contact with the flange 21b of the upper pick plate 21, the end face 212 pushes the flange 21b vertically downward.

The flange 21b of the upper pick plate 21 is pushed downward and the upper pick plate 21 moves vertically downward along the guide rod 14 together with the lower pick plate 22 against the elastic force of the middle coil spring 17 while maintained in the horizontal position.

When the upper pick plate 21 moves downward, the pins 43 and 44 of the right arm 41 inserted into the groove 24 are moved downward by the upper pick plate 21, and the pins 45 and 46 of the left arm 42 inserted into the groove 25 are also moved downward by the upper pick plate 21.

Thereby, the right arm 41 and the left arm 42 rotate about the shaft C1, and the leading ends of the arms 41 and 42 are inclined to be lower than the shaft C1 as illustrated in FIG. 17. When the leading end of the right arm 41 is inclined to be lower than the shaft C1, the front pin 43 moves lower than the pin 44. When the leading end of the left arm 42 is inclined to be lower than the shaft C1, the front pin 45 moves lower than the pin 46.

The cutouts 21c and 21d of the upper pick plate 21 that form the grooves 24 and 25 respectively include the run-off portions 21g and 21h for the pins 44 and 46 to enter, at portions above the back pins 44 and 46 in the front-back direction.

Accordingly, as illustrated in FIG. 17, even when the leading ends of the right arm 41 and the left arm 42 incline to be lower than the shaft C1 and the front pins 43 and 45 move to positions lower than the back pins 44 and 46, the back pins 44 and 46 at relatively high positions enter the run-off portions 21g and 21h, so that the back pins 44 and 46 do not push the upper pick plate 21 upward.

As a result, the front pins 43 and 45 push the lower pick plate 22 downward but the back pins 44 and 46 do not block the downward motion of the upper pick plate 21. Thereby the upper pick plate 21 and the lower pick plate 22 move vertically downward while the upper pick plate 21 and the lower pick plate 22 are stacked to contact with each other in the horizontal positions.

When the upper pick plate 21 and the lower pick plate 22 stacked on one another further move downward, the lower end of the electrode tip 220 held by the upper electrode tip holder 30 comes into contact with the top face 51 of the electrode tip contact portion 50 as illustrated in FIG. 18.

While the electrode tip 220 is in contact with the top face 51, the gun arm of the welding gun 200 further moves downward to increase the margin for inserting the smaller diameter portion 211 of the shank 210 into the electrode tip 220 by a length corresponding to a distance in which the electrode tip 220 has moved downward to the upper electrode tip holder 30 by friction relative to the smaller diameter portion 211 of the shank 210.

The smaller diameter portion 211 has a tapered shape. Accordingly, an increase of the margin for the insertion strengthens the connection or fitting between the smaller diameter portion 211 of the shank 210 and the electrode tip 220, thereby the electrode tip 220 is attached to the shank 210 with sufficient connection.

The welding gun 200 to which the electrode tip 220 is attached moves upward until the leading end of the electrode tip 220 is separated from the top face 51 and moves forward of the replacing and holding device 100 to be separated from the replacing and holding device 100.

In the replacing and holding device 100 from which the welding gun 200 is separated, the lower pick plate 22 is pushed vertically upward by the elastic force of the middle coil spring 17, which was elastically deformed, and returns to the original stationary state where the upper coil spring 15, the middle coil spring 17, and the lower coil spring 16 are balanced (FIGS. 2 and 3), that is, the right arm 41 and the left arm 42 return to their horizontal positions.

As described in detail, the replacing and holding device 100 for the electrode tip 220 according to this embodiment utilizes the motions of the welding gun 200 to remove the electrode tip 220 from the welding gun 200 and attach the temporarily removed electrode tip 220 to the welding gun 200. Accordingly, it is unnecessary for the replacing and holding device 100 to have power (power source) for the operation.

Furthermore, the replacing and holding device 100 for the electrode tip 220 according to this embodiment is capable of holding the electrode tip 220 removed from the welding gun 200. Accordingly, it is possible to attach the temporarily removed electrode tip 220 to the welding gun 200 again and use the electrode tip 220.

Still further, the replacing and holding device 100 for the electrode tip 220 according to this embodiment is provided with the run-off portions 21g and 21h. Accordingly, the electrode tips 220 with different lengths can be attached to the welding gun 200.

Note that the replacing and holding device for the electrode tip according to the present disclosure may not include a run-off portion. Specifically, for example, in a case of the replacing and holding device where only an electrode tip 220 with no difference in length (i.e., constant length) such as a new electrode tip 220 is attached to the shank 210 by the replacing and holding device, the upper pick plate 21 may not include the run-off portions 21g and 21h.

In a case where the upper pick plate 21 does not include the run-off portions 21g and 21h, when the leading end of the upper rotating arm portion 40 inclines to be lower than the shaft C1 upon attaching the held electrode tip 220 to the welding gun 200, a gap between the upper pick plate 21 and the lower pick plate 22 is generated similar to a case where the leading end of the upper rotating arm portion 40 inclines to be higher than the shaft C1. This makes it difficult to secure a sufficient margin for inserting the smaller diameter portion 211 of the shank 210 into the electrode tip 220.

However, in the case of the replacing and holding device for attaching the electrode tip 220 with the constant length, a length between the bottom face of the lower pick plate 22 and the top face 51 of the electrode tip contact portion 50 is set according to the length of the electrode tip 220 to secure a sufficient margin for inserting the smaller diameter portion 211 of the shank 210 in a state where the upper pick plate 21 and the lower pick plate 22 are not separated, that is, in a state where the upper rotating arm portion 40 is in the horizontal position.

Thereby, the upper pick plate 21 and the lower pick plate 22 are in contact with each other while the leading end of the electrode tip 220 is in contact with the top face 51 of the electrode tip contact portion 50. Accordingly, it is possible to secure a sufficient margin for inserting the smaller diameter portion 211 of the shank 210 by further moving the gun arm downward. Thereby, a sufficient connection between the shank 210 and the electrode tip 220 can be achieved.

On the other hand, in the replacing and holding device 100 according to this embodiment, the upper pick plate 21 includes the run-off portions 21g and 21h. Accordingly, the upper pick plate 21 and the lower pick plate 22 are kept in the contact state relative to each other even when the leading end of the upper rotating arm portion 40 inclines to some extent to be lower than the shaft C1 upon attaching the held electrode tip 220 to the welding gun 200. As a result, it is possible to secure a sufficient margin for inserting the smaller diameter portion 211 of the shank 210 into the electrode tip 220 even when the leading end of the upper rotating arm portion 40 inclines to some extent to be lower than the shaft C1.

Furthermore, adjusting the heights of the run-off portions 21g and 21h relative to the cutouts 21c and 21d enables adjustment of an inclination angle of the upper rotating arm portion 40 for maintaining the upper pick plate 21 and the lower pick plate 22 in the contact state.

The electrode tips 220 removed from the shank 210 fixed to the gun arm of the welding gun 200 have differences in abrasion and variations in lengths depending on the previous use situations. Accordingly, the degree of the inclination of the upper rotating arm portion 40 also varies when the leading end of the electrode tip 220 held by the upper electrode tip holder 30 comes into contact with the top face 51 of the electrode tip contact portion 50. However, adjusting the heights of the run-off portions 21g and 21h according to the maximum length of the electrode tip 220 to be reused makes it possible to hold the electrode tip 220 and appropriately attach the electrode tip 220 to the shank 210 fixed to the gun arm of the welding gun 200 regardless of the variations in the length of the electrode tip 220.

In the replacing and holding device 100 for the electrode tip 220 according to this embodiment, the upper pick plate 21 includes the run-off portions 21g and 21h. However, the lower pick plate 22 may include run-off portions that are similar to the run-off portions 21g and 21h but extend downward. Specifically, the run-off portions expanded downward may be formed in portions of the lower pick plate 22 below the front pins 43 and 45 not to touch the lower pick plate 22.

In the replacing and holding device 100 as configured above, when the leading end of the upper rotating arm portion 40 inclines to be lower than the shaft C1, the front pins 43 and 45 enter the run-off portions in the lower pick plate 22, and the front pins 43 and 45 do not press the lower pick plate 22 downward. Accordingly, it is possible to maintain a state where the upper pick plate 21 and the lower pick plate 22 are stacked and in contact with each other.

Therefore, the replacing and holding device 100 as configured above can secure a sufficient margin for inserting the smaller diameter portion 211 of the shank 210 into the electrode tip 220.

This embodiment has described configurations of the upper electrode tip puller 20, the upper electrode the tip holder 30, the upper rotating arm portion 40, the top face 51 of the electrode tip contact portion 50, the upper coil spring 15, and the middle coil spring 17 and have also described actions for removing the electrode tip 220 connected to the lower end of the welding gun 200 and for holding and re-attaching the electrode tip 220 achieved by the above configurations.

In addition to the configurations described in detail (i.e., base 10, upper electrode tip puller 20, upper electrode tip holder 30, upper rotating arm portion 40, electrode tip contact portion 50, upper coil spring 15, and middle coil spring 17), the replacing and holding device 100 according to this embodiment includes the lower electrode tip puller 60, the lower electrode tip holder 70, the lower rotating arm portion 80, the bottom face 52 of the electrode tip contact portion 50, and the lower coil spring 16, but the latter configurations and actions thereof are not described in detail herein.

The configurations not described in detail and the foregoing configurations described in detail are symmetrical in the vertical direction with respect to the horizontal line with the electrode tip contact portion 50 placed therebetween. This symmetrical configuration acts on the removal of the electrode tip from the shank fixed to the gun arm of the lower welding gun (not illustrated) having the upper end connected with the electrode tip and acts on holding and re-attachment of the electrode tip.

The welding gun for resistance welding has the upper shank 210 and the lower shank arranged in pairs. Accordingly, the replacing and holding device 100 according to this embodiment is capable of removing, holding, and attaching the electrode tip with respect to the pair of upper and lower shanks simultaneously or sequentially without changing the posture of the gun arm of the welding gun.

The replacing and holding device 100 according to this embodiment may have only a configuration corresponding to the upper gun arm of the welding gun 200 described in detail. Specifically, in the replacing and holding device for the electrode tip according to the present disclosure, the replacing and holding device 100 may be configured without the lower electrode tip puller 60, the lower electrode tip holder 70, the lower rotating arm portion 80, and the lower coil spring 16.

In this case, the lower plate 12 may have a configuration that also functions as the electrode tip contact portion 50.

Furthermore, in this case, the middle coil spring 17 does not support the lower electrode tip holder 70 and may have the same elastic modulus as that of the upper coil spring 15. In the case of the lower plate 12 having the function of the electrode tip contact portion 50, the lower end of the middle coil spring 17 is arranged to contact the top face of the lower plate 12.

The replacing and holding device 100 according to this embodiment corresponds to the welding gun 200 that moves straight during removal and attachment of the electrode tip 220 (i.e., a so-called C-type welding gun) but is not necessarily limited to such a type.

In the replacing and holding device 100 according to this embodiment, the electrode tip 220 removed from the welding gun 200 is held by the upper electrode tip holder 30 or the lower electrode tip holder 70. However, when the held electrode tip 220 is to be discarded, the smaller diameter portion 211 of the shank 210 is shallowly inserted into the held electrode tip 220 and hooked on the electrode tip 220 by the motion of the welding gun 200. In this state, the welding gun 200 moves forward to remove the electrode tip 220 from the upper electrode tip holder 30 or the lower electrode tip holder 70, thereby dropping the electrode tip 220 similar to the device for removing the electrode tip.

The replacing and holding device 100 according to this embodiment has one middle coil spring 17 for supporting the upper electrode tip puller 20 from the bottom and supporting the lower electrode tip puller 60 from the top. However, the number of middle coil springs 17 is not limited to one, and the middle coil spring 17 may be divided into two or more pieces.

What is claimed is:

1. A replacing and holding device for an electrode tip comprising:
    an electrode tip puller comprising two pick plates stacked one upon another, the two pick plates to be inserted between an end face of the electrode tip fitted into a shank fixed to a gun arm of a welding gun and an end face of a larger diameter portion of the shank;
    a guide rod extending through each of the two pick plates to guide motions of the two pick plates in a stacked direction thereof;
    a pick plate interspace increasing mechanism configured to increase a space between the two pick plates according to positions of the two pick plates guided along the guide rod;
    an electrode tip holder disposed in one of the two pick plates to hold the electrode tip pulled out from the shank; and
    an electrode tip contact portion arranged to be located in front of the shank in with respect to an insertion direction of the shank, the electrode tip contact portion being configured to come into contact with the electrode tip during a motion of the welding gun to insert the shank into the electrode tip held by the electrode tip holder.

2. The replacing and holding device according to claim 1, wherein the electrode tip holder comprises:
    a cutout having a diameter smaller than an outer diameter of an outer peripheral portion of the electrode tip to be inserted therein; and
    an elastically deformable portion configured to allow elastic deformation of an outside surface of the cutout to increase the diameter of the cutout to the outer diameter of the outer peripheral portion by the electrode tip inserted into the cutout.

3. The replacing and holding device according to claim 1, wherein the pick plate interspace increasing mechanism comprises:
    two pins disposed along the two pick plates, the two pins being configured to be displaced with the two pick plates; and
    an arm configured to cause a height difference between the two pins based on positions of the two pick plates along the guide rod;
    wherein the pick plate interspace increasing mechanism is configured to change a distance between the two pick plates due to the height difference of the two pins.

4. The replacing and holding device according to claim 2, wherein the pick plate interspace increasing mechanism comprises:

two pins disposed along the two pick plates, the two pins being configured to be displaced with the two pick plates; and an arm configured to cause a height difference between the two pins based on positions of the two pick plates along the guide rod;

wherein the pick plate interspace increasing mechanism is configured to change a distance between the two pick plates due to the height difference of the two pins.

5. The replacing and holding device according to claim 3, wherein a first one of the two pick plates includes a run-off portion, and wherein the run-off portion is configured to receive a first one of the two pins having the height difference so that the first one of the two pins does not press the first one of the two pick plates due to the motion of the welding gun to insert the shank into the electrode tip held by the electrode tip holder.

6. The replacing and holding device according to claim 4, wherein a first one of the two pick plates includes a run-off portion, and wherein the run-off portion is configured to receive a first one of the two pins having the height difference so that the first one of the two pins does not press the first one of the two pick plates due to the motion of the welding gun to insert the shank into the electrode tip held by the electrode tip holder.

7. The replacing and holding device according to claim 1, wherein the electrode tip puller is a first electrode tip puller, the pick plate interspace increasing mechanism is a first pick plate interspace increasing mechanism, and the electrode tip holder is a first electrode tip holder, the replacing and holding device further comprising:

a second electrode tip puller, a second pick plate interspace increasing mechanism, and a second electrode tip holder, wherein a first one of first and second electrode tip pullers, a first one of the first and second pick plate interspace increasing mechanisms, and a first one of the first and second electrode tip holders are symmetrically arranged with a second one of the first and second electrode tip pullers, a second one of the first and second pick plate interspace increasing mechanisms, and a second one of the first and second electrode tip holders at predetermined locations along an axial direction of the guide rod with the electrode tip contact portion placed therebetween.

8. The replacing and holding device according to claim 2, wherein the electrode tip puller is a first electrode tip puller, the pick plate interspace increasing mechanism is a first pick plate interspace increasing mechanism, and the electrode tip holder is a first electrode tip holder, the replacing and holding device further comprising:

a second electrode tip puller, a second pick plate interspace increasing mechanism, and a second electrode tip holder, wherein a first one of first and second electrode tip pullers, a first one of the first and second pick plate interspace increasing mechanisms, and a first one of the first and second electrode tip holders are symmetrically arranged with a second one of the first and second electrode tip pullers, a second one of the first and second pick plate interspace increasing mechanisms, and a second one of the first and second electrode tip holders at predetermined locations along an axial direction of the guide rod with the electrode tip contact portion placed therebetween.

9. The replacing and holding device according to claim 3, wherein the electrode tip puller is a first electrode tip puller, the pick plate interspace increasing mechanism is a first pick plate interspace increasing mechanism, and the electrode tip holder is a first electrode tip holder, the replacing and holding device further comprising:

a second electrode tip puller, a second pick plate interspace increasing mechanism, and a second electrode tip holder, wherein a first one of first and second electrode tip pullers, a first one of the first and second pick plate interspace increasing mechanisms, and a first one of the first and second electrode tip holders are symmetrically arranged with a second one of the first and second electrode tip pullers, a second one of the first and second pick plate interspace increasing mechanisms, and a second one of the first and second electrode tip holders at predetermined locations along an axial direction of the guide rod with the electrode tip contact portion placed therebetween.

10. The replacing and holding device according to claim 4, wherein the electrode tip puller is a first electrode tip puller, the pick plate interspace increasing mechanism is a first pick plate interspace increasing mechanism, and the electrode tip holder is a first electrode tip holder, the replacing and holding device further comprising:

a second electrode tip puller, a second pick plate interspace increasing mechanism, and a second electrode tip holder, wherein a first one of first and second electrode tip pullers, a first one of the first and second pick plate interspace increasing mechanisms, and a first one of the first and second electrode tip holders are symmetrically arranged with a second one of the first and second electrode tip pullers, a second one of the first and second pick plate interspace increasing mechanisms, and a second one of the first and second electrode tip holders at predetermined locations along an axial direction of the guide rod with the electrode tip contact portion placed therebetween.

11. The replacing and holding device according to claim 5, wherein the electrode tip puller is a first electrode tip puller, the pick plate interspace increasing mechanism is a first pick plate interspace increasing mechanism, and the electrode tip holder is a first electrode tip holder, the replacing and holding device further comprising:

a second electrode tip puller, a second pick plate interspace increasing mechanism, and a second electrode tip holder, wherein a first one of first and second electrode tip pullers, a first one of the first and second pick plate interspace increasing mechanisms, and a first one of the first and second electrode tip holders are symmetrically arranged with a second one of the first and second electrode tip pullers, a second one of the first and second pick plate interspace increasing mechanisms, and a second one of the first and second electrode tip holders at predetermined locations along an axial direction of the guide rod with the electrode tip contact portion placed therebetween.

12. The replacing and holding device according to claim 6, wherein the electrode tip puller is a first electrode tip puller, the pick plate interspace increasing mechanism is a first pick plate interspace increasing mechanism, and the electrode tip holder is a first electrode tip holder, the replacing and holding device further comprising:

a second electrode tip puller, a second pick plate interspace increasing mechanism, and a second electrode tip holder, wherein a first one of first and second electrode tip pullers, a first one of the first and second pick plate interspace increasing mechanisms, and a first one of the first and second electrode tip holders are symmetrically arranged with a second one of the first and second electrode tip pullers, a second one of the first and second pick plate interspace increasing mechanisms, and a second one of the first and second electrode tip holders at predetermined locations along an axial direction of the guide rod with the electrode tip contact portion placed therebetween.

13. The replacing and holding device according to claim 1, wherein the electrode tip holder is a plate having an opening configured to receive and hold the electrode tip, the electrode tip holder being mounted to a face of one of the two pick plates of the electrode tip puller.

14. The replacing and holding device according to claim 1, wherein the electrode tip contact portion is a plate oriented to be perpendicular to the insertion direction of the shank.

* * * * *